United States Patent
Yu et al.

(10) Patent No.: US 11,580,149 B2
(45) Date of Patent: *Feb. 14, 2023

(54) DATA ANALYTICS SYSTEMS AND METHODS

(71) Applicant: Verso Biosciences, Inc., Davis, CA (US)

(72) Inventors: Bruce W. Yu, San Francisco, CA (US); Chi-Ming J. Chien, San Francisco, CA (US); Jeffrey R. Wong, San Francisco, CA (US); Steven M. Watkins, Davis, CA (US)

(73) Assignee: Verso Biosciences, Inc., Davis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,271

(22) Filed: Jun. 14, 2021

(65) Prior Publication Data
US 2021/0382926 A1      Dec. 9, 2021

Related U.S. Application Data

(63) Continuation of application No. 16/392,180, filed on Apr. 23, 2019, now Pat. No. 11,036,779.

(Continued)

(51) Int. Cl.
| | |
|---|---|
| *G06F 16/36* | (2019.01) |
| *G06F 16/35* | (2019.01) |
| *G06F 16/31* | (2019.01) |
| *G06F 17/15* | (2006.01) |
| *G06F 40/247* | (2020.01) |

(52) U.S. Cl.
CPC .......... *G06F 16/355* (2019.01); *G06F 16/328* (2019.01); *G06F 16/374* (2019.01); *G06F 17/15* (2013.01); *G06F 40/247* (2020.01)

(58) Field of Classification Search
CPC ..... G06F 16/328; G06F 16/355; G06F 16/374
See application file for complete search history.

(56) References Cited

U.S. PATENT DOCUMENTS

| | | | |
|---|---|---|---|
| 6,086,736 A * | 7/2000 | Dasgupta | G01N 27/44743 204/453 |
| 6,631,333 B1 * | 10/2003 | Lewis | G01N 33/0075 977/959 |

(Continued)

*Primary Examiner* — Daniel Rodriguez
(74) *Attorney, Agent, or Firm* — Stoel Rives LLP

(57) ABSTRACT

Data analytics systems and methods are disclosed herein. A parser can parse reference data from various data sources to store in a data structure. An uploader can receive study data designated by a researcher and store the study data in the data structure. A matcher can compare analyte nameset data in the study data with analyte nameset data from the reference data to generate one or more links each correlating an instance of an analyte in the study data with an instance of that analyte in the reference data. Library overlays each include one or more modules to access reference data to generate organized associations of reference data. A calculation engine can receive a selection of one or more library overlay(s) and manipulate the reference data and study data according to the organized associations of the selected library overlay(s) to generate configured data stored in a collection of data caches for presentation to a researcher via a user interface.

10 Claims, 15 Drawing Sheets

Related U.S. Application Data

(60) Provisional application No. 62/661,404, filed on Apr. 23, 2018.

(56) References Cited

U.S. PATENT DOCUMENTS

| | | | | |
|---|---|---|---|---|
| 8,674,993 | B1* | 3/2014 | Fleming | G06Q 40/06 707/794 |
| 9,400,872 | B2* | 7/2016 | McGilvery | G16H 20/70 |
| 2003/0233257 | A1* | 12/2003 | Matian | G16H 15/00 705/3 |
| 2004/0029120 | A1* | 2/2004 | Goodenowe | G16C 20/90 435/7.1 |
| 2004/0143461 | A1* | 7/2004 | Watkins | G16H 10/60 600/300 |
| 2005/0149566 | A1* | 7/2005 | Baek | G16B 50/40 |
| 2010/0324398 | A1* | 12/2010 | Tzyy-Ping | A61B 5/14532 600/365 |
| 2011/0010099 | A1* | 1/2011 | Adourian | G16B 5/30 702/19 |
| 2011/0027892 | A1* | 2/2011 | Meacham | G01N 30/86 422/62 |
| 2011/0129817 | A1* | 6/2011 | Banchereau | C12Q 1/689 435/6.15 |
| 2011/0276342 | A1* | 11/2011 | Kazmierczak | G16H 10/20 705/2 |
| 2012/0015368 | A1* | 1/2012 | Del Galdo | G01N 33/6893 435/6.12 |
| 2013/0198259 | A1* | 8/2013 | Krizmanich | G06Q 10/10 709/203 |
| 2014/0011879 | A1* | 1/2014 | Baribaud | G16H 50/20 435/7.92 |
| 2014/0236491 | A1* | 8/2014 | Katayev | G16H 50/70 702/19 |
| 2014/0362087 | A1* | 12/2014 | Irani | E21B 41/00 345/440 |
| 2016/0012538 | A1* | 1/2016 | Costaceque-Cecchi-Dimeglio | G06Q 50/20 705/36 R |
| 2016/0202239 | A1* | 7/2016 | Voros | G01N 33/6893 506/13 |
| 2018/0075159 | A1* | 3/2018 | Lin | G06F 16/9024 |
| 2018/0357307 | A1* | 12/2018 | Sevenster | G16Z 99/00 |
| 2019/0000382 | A1* | 1/2019 | Fitzpatrick | G06F 1/1613 |
| 2019/0257814 | A1* | 8/2019 | Leigh | H04L 67/12 |
| 2019/0357776 | A1* | 11/2019 | Carreon | A61B 5/4875 |

\* cited by examiner

US 11,580,149 B2

DATA ANALYTICS SYSTEMS AND METHODS

RELATED APPLICATIONS

This patent application is a continuation of U.S. patent application Ser. No. 16/392,180 entitled DATA ANALYTICS SYSTEMS AND METHODS, filed Apr. 23, 2019, which claims the benefit of priority under 35 U.S.C. § 119(e) of U.S. Provisional Patent Application No. 62/661,404, entitled DATA ANALYTICS SYSTEMS AND METHODS, filed Apr. 23, 2018, each of which is hereby incorporated by reference in its entirety.

TECHNICAL FIELD

The present disclosure relates to systems and methods for facilitating data analytics of data from multiple data sources. In particular, the present disclosure relates to systems and methods for identifying, correlating, and presenting data from multiple data sources in meaningful ways even when a researcher is unaware of potential relationships across some of the data sources.

DETAILED DESCRIPTION

Figure 1:
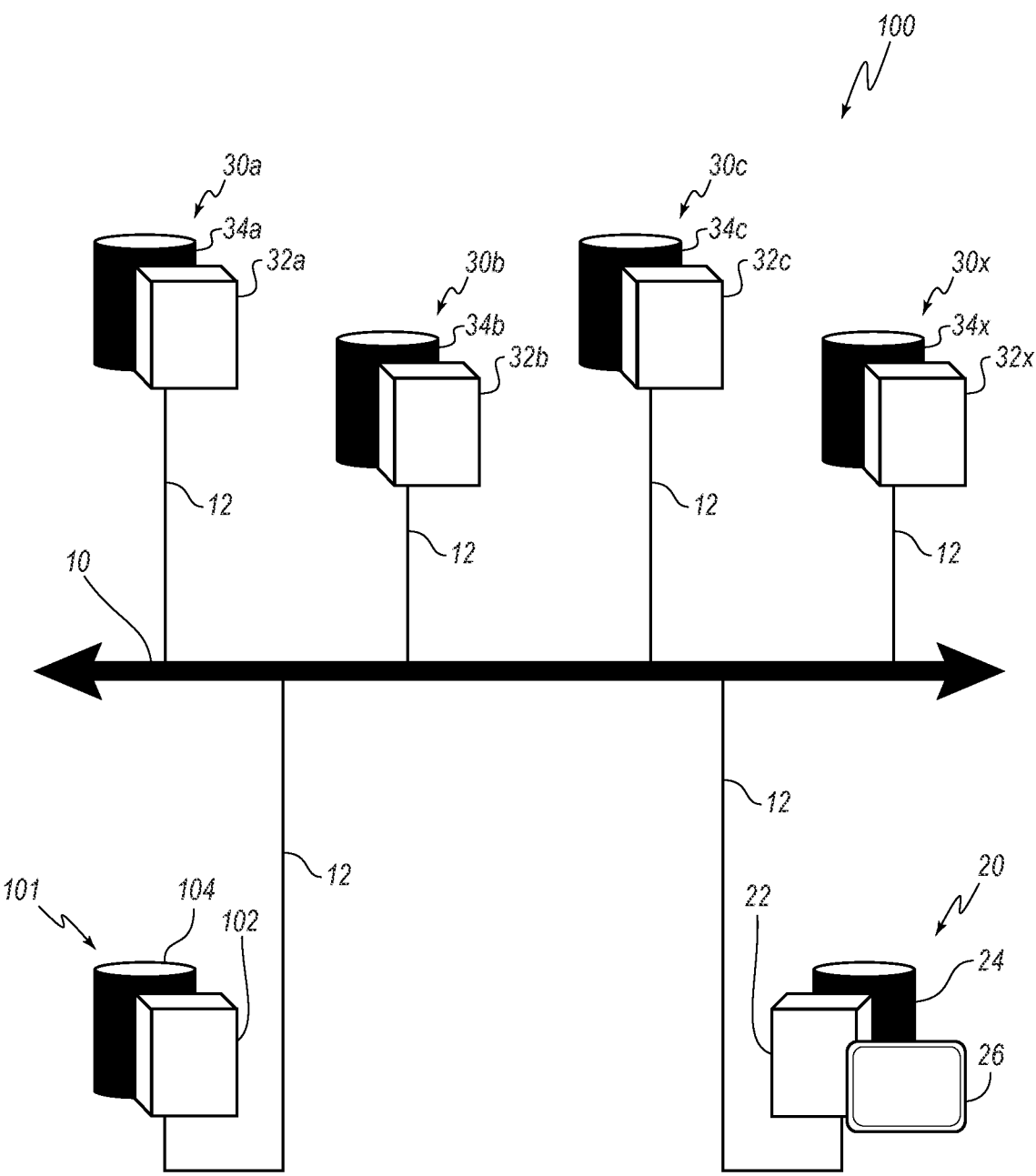
FIG. 1 is a system diagram of a plurality of computing systems, each with a connection to a network that includes a data analytics system having a data analytics computing system, according to one embodiment of the present disclosure.

Researchers in various fields of science often conduct studies that may intersect tens of thousands of analytes. Scientific research typically involves identifying meaningful groupings of analytes. For example, the presence of a particular analyte may be inconsequential; however, in the presence of other particular analytes, meaning may arise that is significant to the scientific field or study. The same may be true of variations in amounts of analytes, or changes of state, characteristics of analytes, etc.

An analyte may have a variety of properties or characteristics inherent to it; however, the name of an analyte is not inherent to the analyte. Many, if not most, analytes may be known by multiple names. This plurality of synonymous names can be a result of disparate naming conventions, disparate information about an analyte when different scientists studied the analyte, the appearance of the same analyte in disparate fields of science, changes in naming conventions over time, and for other reasons.

A researcher may have study data that includes analytes where data that can assist in meaningful interpretation of those analytes is found across multiple reference databases. Furthermore, the analytes may be referred to by different names in each of the reference databases. Heretofore, the researcher has not had a means of combining the interpretive data across multiple reference databases and resolving any name differences between the reference databases such that the interpretive data referring to an analyte by one name in one reference database could be combined with the interpretive data referring to the same analyte by a different name in a second database.

Presently a standard practice is to use a single reference data source at a time. The data analytics systems and methods of this disclosure provide a researcher an ability to apply multiple reference data sources simultaneously while significantly reducing or eliminating the errors inherent in an otherwise brute force approach to analyzing data from more than one reference data source. The embodiments described herein also provide a means of identifying previously unrecognized scientifically meaningful groupings or sets of analytes.

An application may refer generally to a software system installed on a computing device, or a computing device network, to execute programmatic instructions and other computing functions. Examples of applications include word processors, accounting packages, games, etc.

A researcher refers to an individual, a collection of individuals, or an organization engaged in a study of a scientific or social scientific nature. The concept of researcher includes any computer user acting on behalf of the actual researcher.

An analyte may refer to an item, physically tangible or intangible and having one or more measurable or quantifiable characteristic(s) or propert(y/ies), and which may be subject to scientific examination. In certain embodiments, an analyte may also refer to a particular quantifiable or measurable property/characteristic of an item, the item being physically tangible or intangible, which may be subject to scientific examination. By way of examples, an analyte may be a small molecule or a protein in a biological sample and/or a quantitative measurement of the number of moles per gram thereof; a microcurrent or a measurement in milliamperes thereof; a subatomic particle or a mass, charge, spin or lifetime thereof; a population subgroup within a nation state or a size or measurable behavior thereof; an exoplanet or a diameter, mass or orbital characteristics thereof, etc. In simplest terms, an analyte is a "thing" that can be studied and/or any measurable characteristic or property of the "thing" that can be studied, including physical "things" and non-physical "things."

A study refers to a programmatic examination of an analyte or collection of analytes involving the application of scientifically sound principles, methods, and methodologies, etc.

Study data refers to data derived or developed from a particular study.

Reference data refers to data from any of a variety of sources, wherein the data may be used to derive scientifically meaningful information about one or more analyte(s) or group(s) of analytes within study data.

A library overlay refers to a collection of software modules, wherein each module may comprise both data and data manipulation routines. A data manipulation routine manipulates reference data to produce screening data, which may be used in conjunction with study data in a manner that allows a researcher to derive significant meaning(s) and/or relationship(s) from the study data (or, conversely, to identify an absence of a particular significant meaning/relationship). Each individual software module of a library overlay may be tunable via a set of edit tools in order to manipulate the resulting screening data such that (a) significant meaning(s)/relationship(s) may be amplified, isolated, graded, etc., to develop greater understanding of the meaning(s)/relationship(s).

A database refers to a logical structure for receiving, organizing, storing, accessing and manipulating a volume of information. A database may be coupled to, or integral to, a computing system. For this disclosure, a database may include a database management system without distinction from the database itself. A database may be one as rudimentary as a text file in ASCII format, a spreadsheet of an application (such as, e.g., Microsoft® Excel® or Apple® Numbers®), or as advanced as to require a fully dedicated database management system (such as, e.g., Oracle® Database, MySQL Enterprise Edition, or Microsoft® SQL Server®).

A data store refers to a data repository, for example, a database, in any electronic form. In other words, a data "store" is any conventional electronic data storage system.

A data structure refers to a logical arrangement of data, and may include related functionality (e.g., tables, indices, triggers, etc.). A data structure may reside within, be created in, or otherwise be associated with a memory, a computer readable medium, or a data store. In some instances, a data structure may be a distinct database or data store.

A web browser or generic web browser refers to any computer-operated system for navigating about the Internet and/or interacting with various services available through the Internet, including, but not limited to Microsoft® Internet Explorer®, Apple® Safari®, Google Chrome™, Mozilla® Firefox®, etc.

A processing unit refers to any component of a computing system, including, but not limited to hardware (e.g., one or more processors), firmware, software, or any appropriate combination thereof, capable of executing machine-readable instructions.

A computing system refers to an electronic or electrical device capable of performing calculations according to a set of machine-readable instructions. A computing system includes at least one processing unit, and may include additional peripherals, such as, e.g., a printer, local storage in the form of one or more hard disk drives and/or solid-state drives, a power supply and/or power management system, etc.

A network refers to a method of coupling together a plurality of computing systems over various communication media by means of hardware, software, and any collection of standardized computer communication protocols and topologies. A network may be privately owned and operated, or it may be a public network, and is capable of creating secure computing system-to-computing system communication connections.

Nameset refers to any of a variety of methods of naming or otherwise identifying or labeling an analyte, whether exclusively alphabetic, numeric, mixed alpha-numeric, with or without special character(s), etc., and including, but not limited to proper scientific name, common-use name, generic name, quasiname, pseudonym, synonym, formal abbreviation, informal abbreviation, etc.

A *nexus* refers to any connection or link between at least two things, where a thing may be an analyte, a datum, a value, etc. The connection or link may provide a relationship between the at least two things, wherein the relationship may be an association, a correlation, a commonality, etc. among the at least two things. A *nexus* includes the concept of a one-to-one relationship, a one-to-many relationship, a many-to-one relationship, and a many-to-many relationship.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail to avoid obscuring aspects of the embodiments. Furthermore, the described features, structures, or characteristics may be combined in any suitable manner in one or more embodiments.

FIG. 1 is a system diagram of a plurality of computing systems 20, 30a, 30b, 30c, etc., each with a connection 12 to a network 10 that includes a data analytics system 100 having a data analytics computing system 101, according to one embodiment of the present disclosure. The data analytics system 100 may create a composite set of data that provides a *nexus* between different data sets of analyte information from a variety of sources, as described below. The connections 12 between the network 10 and each of the computing systems 20, 30a, 30b, 30c, etc., 101 may be of any suitable type, including appropriate hardware, software, protocols, etc. The connections 12 between each computing system among the collection of computing systems and the network 10 may be persistent or transient. The network 10 may permit one or more of the computing systems of the plurality of computing systems to communicate in a variety of ways in order to exchange information, such as, e.g., scientific study data. Any of the computing systems of the plurality of computing systems may connect 12 via the network 10 to one or more other computing system(s) of the plurality of computing systems to request, transmit, or receive information. Such information may be in the form of a plain text file, structured data file, programmatic data, etc., without limitation, transported across the network 10 via any appropriate network transport protocol.

A researcher computing system 20 is among the plurality of computing systems connected 12 to the network 10. The researcher computing system 20 includes at least a processing unit 22, one or more databases 24, and a user interface system 26. The processing unit 22 is capable of accessing the database 24, and may be capable of performing basic, or basic and advanced database management, as well as other computing related functions. The researcher computing system 20 user interface 26 may include a graphical display, a keyboard, a mouse (or other pointing device), etc. The researcher computing system 20 may be used by a researcher to record, analyze, report, etc., data collected as part of a scientific study. In other words, the researcher may use the researcher computing system 20 to enter data related to a scientific study, to store the data, to analyze the data, and to generate reports based on the data of the study. The researcher may also use the researcher computing system 20 to manipulate data in a variety of ways so as to derive meaningful scientific information from the data of the study.

One or more reference database computing systems 30a, 30b, 30c, etc. may likewise connect 12 to the network 10. The example reference database computing system 30a includes at least a processing unit 32a and one or more databases 34a or other data stores. Each reference database computing system 30a, 30b, 30c, etc. similarly includes at least a processing unit and a database. A reference database computing system 30x may be used hereafter to refer to any member or members of the reference database computing systems 30a, 30b, 30c, etc. Similarly, a reference database 34x may be used hereafter to refer to any member or members of the reference databases 34a, 34b, 34c, etc.

The data analytics computing system 101 includes at least a processing unit 102 and one or more database management systems 104 or other data stores.

One or more of the reference database computing systems 30x may include, store, or otherwise access data of interest, for example, to a researcher using the researcher computing system 20 in support of a study. In other words, each reference database system 30a, 30b, 30c, etc. may contain information about analytes of interest to a researcher for a current study. The volume of analytes in each reference database system 30a, 30b, 30c may exceed one million (1,000,000) analytes. The current method in practice is for the researcher to select one reference database computing system for access to data related to the current study. In a population of analytes intersecting a current study of a researcher, each analyte may have a varied nameset, including several names, abbreviations, pseudonyms, and other identifiers, and some analytes may have dozens of identifiers. Each of the reference database computing systems 30x may identify a particular analyte by one or more different names. Each reference database computing system 30x may be unaware of other names (or other identifiers) by which an analyte is identified in other reference database computing systems. Other than by a "brute force" effort, the researcher may be unable to confidently resolve all nameset possibilities for each analyte to the appropriate analytes. Thus, the researcher, as a practical matter, uses only one reference database computing system 30x, etc. The data analytics system 100 and related methods of the present disclosure can enable a researcher to use multiple reference database computing systems 30x, as well as the researcher computing system 20 to confidently obtain data for a current study.

For similar reasons, researchers presently may research based on a set or body of study data. Combining different sets of study data (e.g., data derived from distinct and/or disparate sources) can prove challenging and problematic because names of analytes may be inconsistent across the various sources of data. For example, a researcher authoring a given set of study data may utilize different naming convention(s) from a researcher authoring a different set of study data. Other than by a "brute force" effort, the researcher may be unable to confidently resolve all nameset possibilities for each analyte to the appropriate analytes. Accordingly, a researcher, as a practical matter, uses only one source of study data in conducting data analytics to research (e.g., discover, explore, confirm) trends and/or patterns and other information about the data. The data analytics system 100 and related methods of the present disclosure can enable a researcher to combine multiple sources of study data for a current study.

Figure 2:
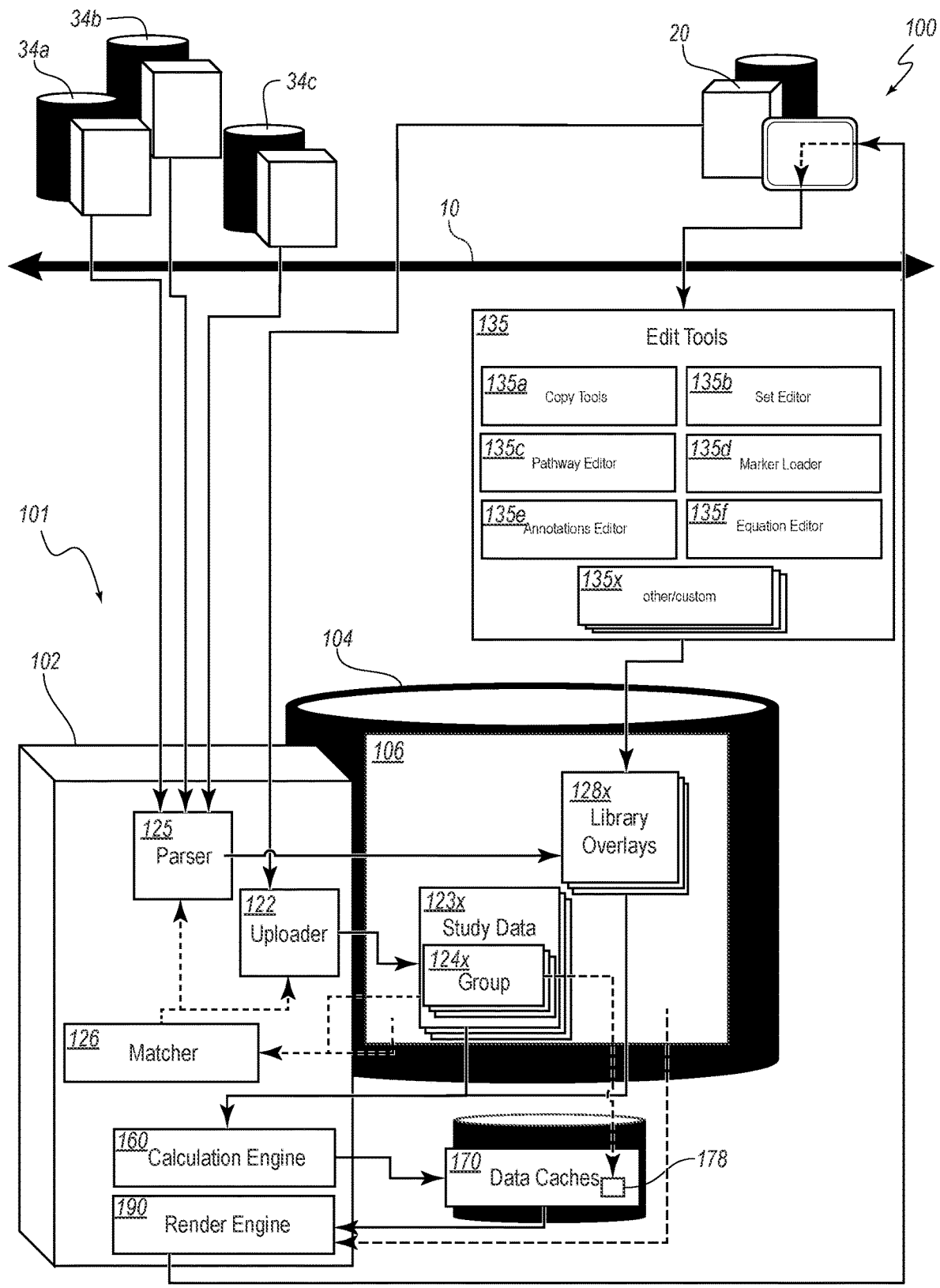
FIG. 2 is a relational diagram illustrating generally various components and a flow of data of a data analytics system (e.g., the data analytics system of FIG. 1), according to one embodiment of the present disclosure.

FIG. 2 is a relational diagram illustrating generally various components and a flow of data of a data analytics system (e.g., the data analytics system 100 of FIG. 1), according to one embodiment of the present disclosure. The data analytics computing system 101 includes one or more processing unit(s) 102, one or more database management system(s) 104, one or more collections of data caches 170, and a collection of edit tools 135. The processing unit 102 may include one or more processors (not shown), one or more memory and/or data storage devices (not shown), an uploader 122, a parser 125, a matcher 126, a calculation engine 160, and a render engine 190. The uploader 122, parser 125, matcher 126, calculation engine 160, and render engine 190 may be stored and operated on a single processing unit 102, or may be disparately stored and/or operated across multiple processing units 102. The edit tools 135 may be stored and/or operated from the processing unit(s) 102. The edit tools 135 may receive user input from a researcher to modify one or more of the organizing components of the library overlay.

The data analytics system 100 may receive reference data from one or more reference data bases 34a, 34b, 34c, etc. (referred to generally and collectively as reference database(s) 34x). Data from the reference databases 34x may be loaded into a data structure 106 of the data analytics computing system 101 through the parser 125. The parser 125 may receive and parse data from any one or more of the reference databases 34x and store the parsed data as reference data in the data structure 106. Each reference database 34x may have a unique data structure, and may contain different data. In one embodiment, a particular reference database 34x may contain data sufficient to allow the parser 125, in addition to parsing the data, to also create a base library overlay 128x from the data of the particular reference database 34x. The parser 125 may organize the reference data of the library overlay 128x according to one or more organizing components of the reference database 34x. A number of library overlays (e.g., 128a, 128b, 128c in FIG. 3) may exist, and reference to library overlay(s) 128x may represent any one or a plurality of library overlay(s). Such a base library overlay 128x may be distinct to the reference data of the particular reference database 34x. In at least one embodiment, the parser 125 may create a compound library overlay 128x applicable to all reference data regardless of source.

The data analytics system 100 may organize the reference data according to one or more organizing components of a library overlay 128x. In the context of the present disclosure, organize, organized, and organization may refer to: a way in which data is organized, e.g., in rows, columns, tables, linking tables, etc.; a character or nature of the data, e.g., metrics, systems, procedures, etc.; and any way that data can be arranged, presented, correlated, and otherwise represented. In other words, organize, organized, and organization is not limited to an arrangement of information in, for example, a spreadsheet, or a database, but extends to conceptual considerations. By way of example, an ambient temperature at a given location reported as 212 degrees Fahrenheit, 100 degrees Celsius, and 373 Kelvin reflects three distinct organizations of data. Likewise, molar data (mol.) of a quantity of an analyte and a mass (g., kg., etc.) of the same analyte reflects at least two distinct organizations of data. Also, the presence in column 1 of a table in a Microsoft® spreadsheet of an atomic number, and in table x of an Oracle® database reflects at least two distinct organizations of data.

The one or more organizing components may be derived from the reference data. That is, the parser may recognize an organizational scheme within the data of a reference database $34x$ and may create, in at least one library overlay $128x$, and organizational schema that, at least in some ways, is similar to that of the particular reference database $34x$. The one or more organizing components that may be derived from the reference data may include one or more of a sets module, an annotations module, a matched markers module, an equations module, and a pathways module.

The parser 125 may load data from a number of reference databases $34x$. By way of example without limitation, the number of reference databases $34x$ may be five (5), $34_1$, $34_2$, $34_3$, $34_4$, $34_5$. The first example reference database $34_1$ may contain data appropriate for the parser 125 to (a) load parsed data to the data structure 106, and (b) generate a base library overlay $128_1$. The second example reference database $34_2$ may likewise contain data appropriate for the parser 125 to (a) load parsed data to the data structure 106 and (b) generate a base library overlay $128_2$ distinct from the base library overlay $128_1$. The example reference databases $34_3$, $34_4$, $34s$ may be such that the parser 125 is able to load parsed data to the data structure 106, but not generate base library overlays. The parser 125, according to one embodiment, may generate a compound library overlay 1286 based on the reference data of the third, fourth, and fifth example reference databases $34_3$, $34_4$, $34s$, the compound library overlay 1286 being distinct from the base library overlays $128_1$, $128_2$. In yet another embodiment, the parser 125 may generate a universal library overlay $128u$ based on the reference data of all five (5) example reference databases $34_1$-$34_5$. In at least one embodiment, the universal library overlay $128u$ may be in addition to and distinct from the base library overlays $128_1$, $128_2$. One or more library overlay(s) $128x$ may be applied to the study data $123x$ to assist the researcher in deriving meaning from the study data. A library overlay $128x$ can also be "tuned" to assist the researcher in further developing scientifically meaningful information about one or more analytes in the study data, as further described below. The reference data from the reference databases $34x$ may, at the data structure 106, have a different organization than at the particular reference databases $34x$. The study data may comprise data for an instance of each analyte of a plurality of analytes, including a particular analyte, and the reference data may comprise data about the plurality of analytes.

Data from a study conducted by a researcher may be stored in a database of the researcher computing system 20 or may be otherwise accessible to the researcher computing system 20. The researcher may initiate a network connection to the data analytics computing system 101. Having connected to the data analytics computing system 101, the researcher may upload data from or through the researcher computing system 20 utilizing the uploader 122. In other words, the data analytics system 100 may receive the study data over a network 10 from a data storage device of the researcher computing system 20.

The data received from the reference database(s) $34x$ may be organized differently than is the data of the study data $123x$. The uploader may upload the data to a study data $123x$ within the data structure. The present disclosure anticipates that the data analytics system 100 may be used with a plurality of studies from one researcher, or a study from each of a plurality of researchers, or a plurality of studies from a plurality of researchers, and FIG. 2 shows such a plurality of studies $123x$. The researcher may interact with the data analytics system 100 to create one or more library overlay(s) $128x$. The one or more library overlay(s) $128x$ created by a researcher may be distinct from any library overlay $128x$ that may have been generated by the parser 125. The researcher may also copy an existing library overlay $128x$, including a library overlay $128x$ previously created by the researcher, or a library overlay $128x$ created by the parser 125, to a new library overlay $128x$. At the time of uploading the study data $123a$, or at a time thereafter, the researcher may also designate within the study data $123a$ a group, such as a group $124x$, such as one or more analytes, one or more characteristics of an analyte, one or more values/value ranges for an analyte, etc. Reference to group $124x$ means a group designated for a corresponding study data $123x$, such as study data $123a$, $123b$, or $123c$; or refers to groups collectively. The researcher may designate more than one group 124 (e.g., samples) within the study data 123 at or after the time of uploading the study data $123a$. For purposes of the present disclosure, a group $124x$ may represent any one or more groups within the study data $123a$. The researcher may designate a group $124a$ with a subgroup $124b$; or may designate a number of groups $124x$ which are each a subgroup of one or more comprising groups $124x$. By way of example without limitation, the researcher may create group $124a$ comprising groups $124b$ and $124c$ wherein group $124b$ comprises a group to itself and group $124c$ comprises groups $124d$ and $124e$.

The data analytics system 100 may compare the study data $123x$ with the reference data to identify one or more correlations between an instance of an analyte in the study data $123x$ and data about that analyte in the reference data. More particularly, the data analytics computing system 101 may employ a matcher 126 to compare analyte nameset data in the study data 123 with analyte nameset data from the reference data (placed in the data structure 106 by the parser 125). The correlations between data about an analyte in the study data and data about the analyte in the reference data may also include a measurement of the analyte. The matcher 126 may be a software module that may match various occurrences of an analyte in any of the data sources (study data $123x$ of the current study and reference data) regardless of nameset identifiers by which the analyte may be identified within the respective data source (study data $123x$ or reference data in the data structure 106). When the matcher 126 identifies an analyte match between the study data $123x$ and the reference data, the matcher 126 may create a *nexus* (e.g., a a link) within the data structure 106 so that the study data $123x$ may reference the occurrence of the analyte in the particular reference database(s) $34x$ where the matching analyte is found, if any. The link reference to the occurrence of the analyte in the data structure 106 may enable the researcher to employ data regarding the particular analyte in analyzing the study data $123x$. The link reference may serve as a *nexus* between the analyte and the data about the analyte.

The researcher may select one or more library overlay(s) 128x from a plurality of library overlays 128x to apply to the study data 123x. Each library overlay 128x may comprise data (reference data) and one or more organizing components (e.g., a collection of parameters, formulae, instructions, etc), which may include any one or more of a sets module, an annotations module, a matched markers module, an equations module, and a pathways module.

Once the researcher applies one or more library overlay(s) 128x, the relevant data and any organizing components (e.g., collection of parameters, formulae, instructions, etc.) of the selected library overlay(s) 128x are passed to a calculation engine 160, along with the study data 123x. The organizing components may comprise any of a number of modules (further described below with reference to FIG. 3). Each module within a library overlay 128x may contain parameters, equations, formulae, instructions, etc. which may direct the calculation engine 160 to accordingly manipulate the collection of reference data and study data to produce results, which the calculation engine 160 may load into a collection of data caches 170. In other words, the study data may be manipulated according to one or more organizing components of the selected library overlay 128x to generate a composite set of data that provides a *nexus* between the reference data and the study data 123x according at least one correlation. In another embodiment, the results of the calculation engine 160 may be passed directly to the render engine 190. In other words, in some embodiments, the collection of data caches 170 may be omitted and data may be passed from the calculation engine 160 directly to the render engine 190 without being stored in an intermediate data structure. In another embodiment, the calculation engine 160 may be configured to incorporate the functions of the render engine 190 such that the resulting generated data may be passed directly from the calculation engine 160 directly to the researcher computing system 20. In another embodiment, the configured data in the collection of data caches 170 may be transmitted to the researcher computing system 20 in batch form such that the researcher may further manipulate the data independent of the data analytics system 100. In one embodiment, the calculation engine 160 may manipulate the reference data from the reference databases 34x. In one embodiment, the calculation engine 160 may manipulate the reference data present in a library overlay received at the calculation engine 160.

The resulting configured data stored in the collection of data caches 170 may be passed to a render engine 190 to configure the data to be presented to the researcher via a user interface 26 of the researcher computing system 20. The researcher may, via the user interface 26, employ any of a set of edit tools 135 to manipulate the configuration of the library overlay(s) 128x. Manipulation of the library overlay(s) 128x (further described below) may result in the calculation engine 160 reprocessing the data and re-loading the collection of data caches 170 at some time thereafter. In this way, manipulation of the library overlay(s) 128x can produce new or alternative results data based on applying the manipulations of the reference data to the study data 123.

The data analytics system 100 may be configured to prevent editing one or more library overlay(s) which may have been generated by the parser 125. The researcher may, however, make a copy of any parser generated-library overlay 128x and edit the copy library overlay 128x. The edit tools 135 may include a copy tool 135a, a set editor 135b, a pathway editor 135c, a marker loader 135d, an annotations editor 135e, and an equation editor 135f. The edit tools 135 may also include one or more custom editing tools 135x for a particular study.

Data generated by the calculation engine 160 may be combined with particular data drawn from the reference data stored in the data structure 106 for inclusion with the configured data to be passed to the render engine 190. By way of example without limitation, an analyte may have an associated pathway. The pathways module 133x may comprise data, from a reference database 34x, related to a pathway, which may be a progression or series of events related to an analyte, or among analytes, leading to a result, product, combination, change of state, etc. A pathway map may represent one or more pathways. The pathways module 133x may comprise data representative of one or more pathways and/or pathway maps, such as parameters, formulae, or instructions that organize one or more analytes according to a pathway. Data representing the pathway map itself may be stored by the parser 125 among the reference data stored in a pathways module 133x in the data structure 106. The calculation engine 160 may generate a number of data related to the analyte and the analyte's associated pathway and send these to the collection of data caches 170. In order to present the pathway (or the pathway map) and the related pathway data generated by the calculation engine 160 to the researcher computing system 20, the related pathway data may be passed from the collection of data caches 170 and the pathway or pathway map itself may be retrieved from the reference data stored in the pathways module 133x in the data structure 106. The data generated by the calculation engine 160 may be paired at the render engine 190 with the pathway or pathway map retrieved from the reference data retrieved from the pathways module 133x of the data structure 106 and sent with appropriate render instructions to the researcher computing system 20.

Figure 3:
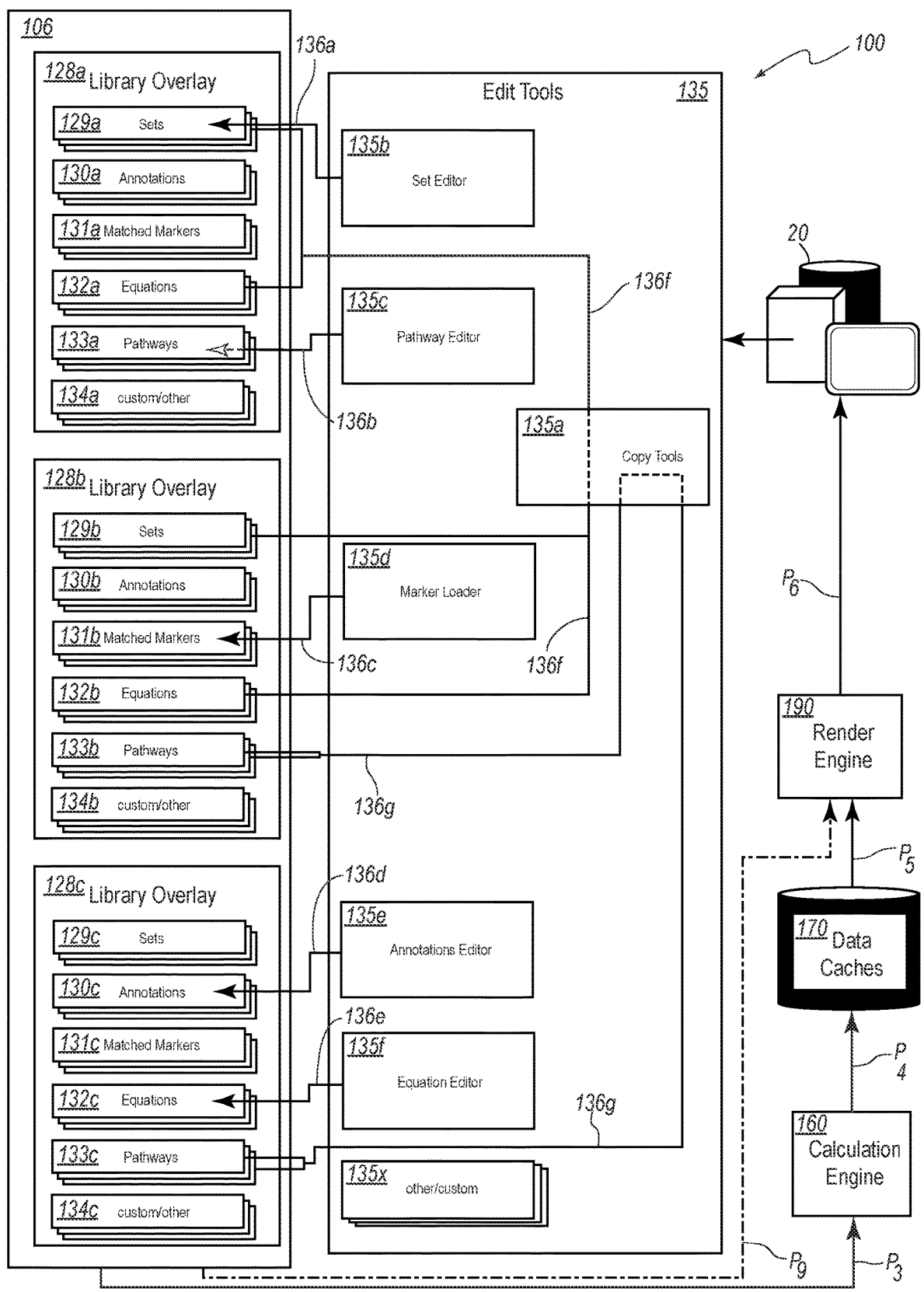
FIG. 3 is a flow diagram showing manipulation of the library overlays of a data analytics system (e.g., the data analytics system of FIG. 1), according to an embodiment of the present disclosure.

FIG. 3 is a flow diagram showing manipulation of the library overlays 128x of a data analytics system (e.g., the data analytics system 100 of FIG. 1), according to an embodiment of the present disclosure. A library overlay 128x may comprise one or more organizing components, which may be derived from reference data of the reference databases 34x, and which may be used to organize data (in particular study data 123x) as, for example, sets, annotations, matched markers, equations, pathways/pathway maps, etc. The data structure 106 containing the reference data is shown, having three library overlays 128a, 128b, 128c, although any number of library overlays 128x may likewise be described.

The reference data stored in the data structure 106 comprises data from multiple reference databases 34x and/or researcher-created organizing data which are associated or organized together based on various parameters preparatory to having one or more library overlays 128x invoked to further prepare the data for manipulation by the calculation engine 160. At the calculation engine 160, the study data 123x may be manipulated according to an organizing component (comprising formulae, parameters, etc.) of a selected library overlay 128x to generate a composite set of data providing a *nexus* between the reference data and the study data. The reference data in the data structure 106 may include sets-organized data, annotations-organized data, matched marker-organized data, equations-organized data, pathways-organized data, and may also include data organized by associations prepared specially for a particular study. The reference data in the data structure 106 may also include metadata related to the various data and organizations of data within the reference data. In other words, the principal content of reference data in the data structure 106 may be data about analytes (relationships between analytes, nameset data, study parameters and results, annotations, conclusions, etc. without limitation), and the reference data in the data structure 106 may include data about data (e.g., metadata about other analyte data), such as source database information, among other things. Metadata within the reference data stored in the data structure 106 may be organized in meaningful associations.

The parser (see, e.g., the parser 125 in FIG. 2) may operate on data received from the various reference databases 34$x$ in isolation from any study data 123$x$. The parser 125 may identify and logically aggregate one or more collection(s) of analytes having some scientifically meaningful relationship in the general context of the data from the reference databases 34$x$ and store logical collection(s) of set relationships in the reference data which is stored in the data structure 106. The application of one or more library overlay(s) 128$x$ may more clearly reveal the existence/non-existence, nature, etc., of scientifically meaningful relationships between analytes within sets (or between sets of analytes) within the study data 123$x$, and thereby enable the researcher to extend the value of the study providing the study data 123$x$. Herein, a sets module 129$x$ may refer to any instance of a sets module 129$a$, 129$b$, 129$c$, etc. in any library overlay 128$x$. A sets module 129$x$ may group together analytes, or data about an analyte or analytes, based on a relationship, wherein the relationship may constitute a scientifically meaningful relationship.

The parser 125 may also identify and logically associate one or more collections of annotations within the data received from the various reference databases 34$x$ and store logical collection(s) of annotations relationships in the reference data. The application of one or more library overlay(s) 128$x$ may allow the researcher to combine annotations from multiple reference databases 34$x$ on the study data 123$x$, and thereby enable the researcher to extend the value of the study providing the study data 123$x$. Herein, an annotations module 130$x$ may refer to any instance of an annotations module 130$a$, 130$b$, 130$c$, etc. in any library overlay 128$x$.

The parser 125 may identify and logically associate one or more collections of identifiers within namesets of analytes within the data received from the various reference databases 34$x$ and store logical collection(s) of nameset relationships in the reference data. The application of one or more library overlay(s) 128$x$ may allow multiple identifiers to be applied to analytes within study data via the matched markers module 131$x$ of the applied library overlay(s) 128$x$ and thereby enable the researcher to extend the value of the study providing the study data 123$x$. Herein, a matched markers module 131$x$ may refer to any instance of a matched markers module 131$a$, 131$b$, 131$c$ in any library overlay 128$x$. A matched markers module 131$x$ may comprise a collection of markers, or identifiers, which, in reference data from one or more reference databases 34$x$, relate to an analyte of the study data 123$x$. A single analyte in the study data 123$x$ may have any number of markers matched to it from the reference databases 34$x$ The parser 125 may identify and logically associate one or more equations or collections of equations related to analytes within the data received from the various reference databases 34$x$ and store logical collection(s) of equations in the reference data. An equation may be an expression of equality such as, e.g., a mathematical equation or an algebraic equation, or an equation may be a chemical equation, an electrical equation, a logical equation, a mechanical equation, etc. The application of one or more library overlay(s) 128$x$ may allow for scientifically meaningful comparisons and combinations of equations related to particular analytes (or groupings of analytes) within the study data 123$x$, and thereby enable the researcher to extend the value of the study providing the study data 123$x$. Herein, an equations module 132$x$ may refer to any instance of an equations module 132$a$, 132$b$, 132$c$ in any library overlay 128$x$. An equations module 132$x$ may provide a datum, wherein a particular equation in the reference data has a relationship to an analyte in the study data 123$x$. An equations module 132$x$ may also provide a calculation from the reference data which may subsequently be calculated at the calculation engine 160. An equations module may relate an equation from the reference data to a plurality of analytes.

The parser 125 may identify and logically associate one or more collections of pathways related to analytes within the data received from the various reference databases 34$x$ and store logical collection(s) of pathways relationships in the reference data. The application of one or more library overlay(s) 128$x$ may more clearly reveal the existence/non-existence, nature, etc., of scientifically meaningful relationships and comparisons between pathways related to particular analytes (or groupings of analytes) within the study data 123$x$, and thereby enable the researcher to extend the value of the study providing the study data 123$x$. Herein, a pathways module 133$x$ may refer to any instance of a pathways module 133$a$, 133$b$, 133$c$ in any library overlay 128$x$.

In the embodiment of FIG. 3, the library overlay 128$a$ includes a plurality of each of: a sets module 129$a$, an annotations module 130$a$, a matched markers module 131$a$, an equations module 132$a$, a pathways module 133$a$, and may also include additional modules specially configured for a particular study. In other embodiments, or in instances of any embodiment of the current disclosure, a library overlay 128$x$ may contain only a single instance of some or all of the modules 129$x$-134$x$, or may contain only some of the modules 129$x$-134$x$. A custom module 134$x$ may refer to any instance of custom module 134$a$, 134$b$, 134$c$ in any library overlay 128$x$. By way of example without limitation, an instance of a library overlay 128$x$ may contain one sets module 129$x$ and a plurality of each of the other modules 130$x$-134$x$, or may include a plurality of 129$x$, and 130$x$, no 131$x$ and 134$x$, and exactly one 132$x$ and 133$x$. As can be appreciated, any combination of modules membership in a library overlay 128$x$ is included within the present disclosure.

The relevant data and parameters of each module 129$x$-134$x$ of each library overlay 128$x$ to be passed to the calculation engine 160 derive from the reference data stored in the data structure 106. The researcher may apply any library overlay 128$x$ which may have been generated by the parser 125, or the researcher may generate (via the edit tools 135) one or more library overlay(s) 128$x$ to apply to the study data, or the researcher may copy and edit one or more library overlay(s) 128$x$ generated by the parser 125 to apply to the data, or the researcher may do any combination of these as appropriate to the study and study data 123$x$. After the selection, creation, and/or editing of one or more library overlay(s) 128$x$, study data 123$a$ and reference data from the data structure 106 associated with the active library overlay(s) 128$x$ are passed to the calculation engine 160. The researcher may also change the selection of the library overlay(s) 128$x$ and/or edit parameters of the modules 129$x$-134$x$ of the active library overlay(s) 128$x$. Once the researcher has applied at least one library overlay 128$x$, the relevant reference data and the study data 123a are passed to the calculation engine 160 along a data path $P_3$. If the researcher then edits a library overlay 128x via the edit tools 135, effects of the editing on the reference data within the particular library overlay 128x may be passed to the render engine 190 and then to the researcher computing system 20. In other words, the researcher may wish to manipulate, alter or adjust the configuration of one or modules 129x, 130x, 131x, 132x, 133x, 134x within a library overlay 128x, necessitating communication to the researcher computing system 20 the effect(s) of the editing on the library overlay 128x and the reference data associated with the particular module 129x-134x of the particular library overlay 128x. Data necessary to render the editing process itself may be passed to the render engine 190 via a path $P_9$. Once the researcher has configured the one or more modules 129x-134x of the current library overlay 128x, the relevant reference data and parameters, formulae, instructions, etc. of the library overlay, along with the study data 123x, are again passed to the calculation engine 160 via the data path $P_3$. The calculation engine 160 processes the data based on the selected library overlay(s) 128x to generate data for populating the collection of data caches 170. Data from the collection of data caches 170 may be sent to a render engine 190 before continuing to the researcher computer system 20.

The library overlays 128a, 128b, and 128c are examples of library overlays 128x, and may each represent, without limitation, a library overlay 128x generated by the parser 125, or a library overlay 128x created by the researcher, or a library overlay 128x created by one researcher and copied by another researcher, or an edited copy of a parser generated-library overlay 128x. The library overlay 128a is shown having three of each of the modules 128a, 129a, 130a, 131a, 132a, 133a, 134a, but any number of each module may be included in the library overlay 128a.

Similarly, another library overlay 128x, for example, 128b, may have the same number of each of the modules 128b-134b, or may have differing numbers of each of the modules 128b-134b.

The collection of edit tools 135 includes copy tools 135a, a set editor 135b, a pathway editor 135c, a marker loader 135d, an annotations editor 135e, an equation editor 135f, and may include one or more custom edit tools 135x specially configured for a particular study.

The copy tools 135a may permit a researcher to copy the contents of one module to another module of the same type, either in the same library overlay 128x, or to a module of the same type in another library overlay 128x. For example, the copy tools 135a are shown as copying the contents of one instance of sets 129a and one instance of equations 132a from the library overlay 128a to an instance of sets 129b and an instance of equations 132b in library overlay 128b. When the copy tools 135a are used to copy an instance of a module from one library overlay 128x to another library overlay 128x, the target module must be of the same type as the source module, and may be, but need not be, the same instance of the module in the target library overlay 128x. In the example above, the copy tools 135a are copying the second instance of sets 129a from library overlay 128a to the second instance of sets 129b in library overlay 128b, and the first instance of equations 132a from library overlay 128a to the first instance of equations 132b in library overlay 128b; however, a different instance of sets 129b or equations 132b could be the target of the copying. The copy tools 135a could also copy one instance of a module to multiple instances of the same type. By way of example without limitation, the copy tools 135a may copy a single instance of pathways 133a to multiple instances of pathways 133c. The copy tools may also copy from one module to multiple modules of the same type in multiple library overlays 128x.

The sets editor 135b may interact directly with a sets module 129x in any of the library overlays 128x. A sets module 129x may comprise data from the reference data related to one or more sets. A set is a plurality of analytes grouped together on a basis of a meaningful relationship. The concept of a set includes a plurality of analytes having no meaningful relationship (a "set" of non-meaningful analytes). Editing a set 129x may help to enhance, refine, refute, clarify, etc., a scientifically meaningful relationship between analytes or sets of analytes in the study data 123x. The set editor 135b is further described below.

The pathways editor 135c, the marker loader 135d, the annotations editor 135e, the equation editor 135f, and any custom editor 135x may similarly interact with a module of the corresponding type to modify parameters or data within the particular module. These modules 130x-134x are further described below.

Figure 4:
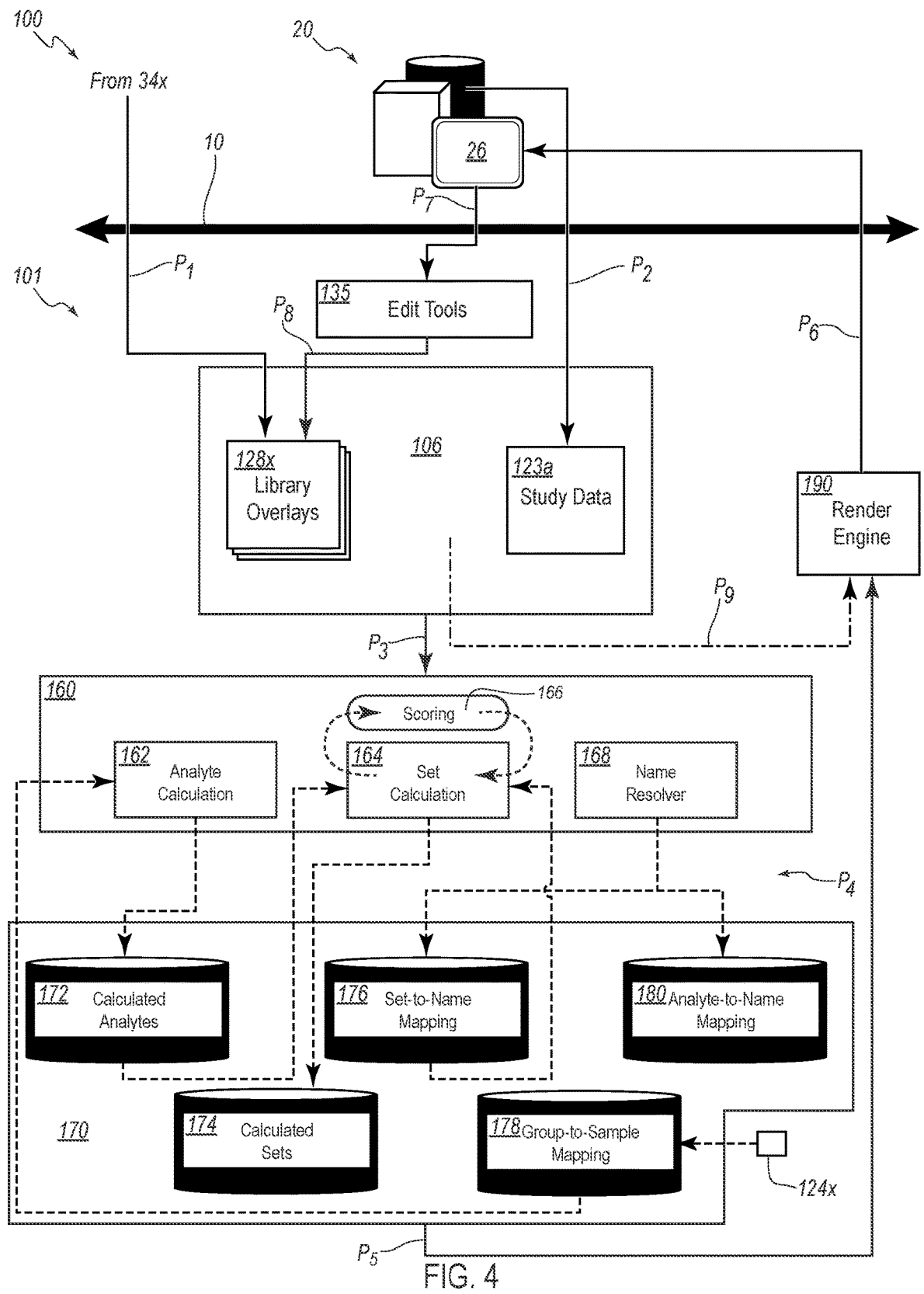
FIG. 4 is a flow diagram showing the movement of data through the data analytics system and, in particular, through the calculation engine and collection of data caches according to an embodiment of the data analytics system to populate the collection of data caches.

FIG. 4 is a flow diagram showing the movement of data through the data analytics system 100 and, in particular, through the calculation engine 160 and collection of data caches 170 according to an embodiment of the data analytics system 100 to populate the collection of data caches 170. Reference data from the reference database(s) 34x or data directly created by a researcher using edit tools 135 populates the library overlays 128x and data from (or through) the researcher computing system 20 populates study data 123x. These data are processed through the calculation engine 160 to generate data to populate the collection of data caches 170, which are then sent to the render engine 190 for presentation to/on the researcher computing system 20.

Data from the reference databases 34x are loaded into the data structure 106 via a data path $P_1$ (with potentially some of the data from the reference database(s) 34x populating one or more library overlay(s) 128x by action of the parser 125). In at least one embodiment, the researcher may interact directly with the data analytics system 100 via a data path $P_7$ to employ the edit tools 135 in order to modify the parameters of, or data within, the various modules of the library overlay(s) 128x and thus directly modify the data within one or more library overlay(s) 128x. The edit tools 135 may modify parameters and/or data of modules in the library overlay(s) via a data path $P_8$. The researcher may access the data tools 135 via data path $P_7$ and create new data which may populate into one or more library overlay(s) via data path $P_8$. In other words, data travel along data path $P_1$ from one or more reference database(s) 34x to populate the library overlay(s) 128x, or along a compound data path $P_7$-edit tools 135-$P_8$ when the researcher creates new reference data (or edits existing reference data) to populate the library overlay(s) 128x. The researcher may upload study data from (or through) the researcher computing system 20 via another data path $P_2$. The data paths $P_1$, $P_2$, and $P_7$ may use any appropriate network 10 to communicate with the data analytics system computing system 101. As described above, the data from the reference data stored in the data structure 106, along with data, parameters, formulae, and instructions of the researcher-selected library overlay(s) 128x, as well as data from the study data 123x, are passed to the calculation engine 160 along data path $P_3$. The data path $P_3$ may be a private network, public network, or combination of private and public networks, depending on the particular topology of the data analytics system 100. The data resulting from the processing by the calculation engine 160 are loaded to the collection of data caches 170 via a data path $P_4$. The data path $P_4$ may likewise employ a public network, private network, or combination of public and private networks depending on the topology of the data analytics system 100. Data from the collection of data caches 170 are sent to the render engine 190 via a data path $P_5$. The data path $P_5$ may be internal to the processing unit (see 102 in FIG. 1), or between multiple processing unit(s) 102. The data from the render engine 190 may be sent to the researcher computing system 20 via a data path $P_6$. The data paths $P_6$ and $P_7$ may use any network 10 architecture appropriate to facilitate communication between the researcher computing system 20 and the data analytics system 100. As described elsewhere herein, some data may be stored in the data structure 106 and may be passed directly to the render engine 190. The data paths $P_1$-$P_9$ may at some points share network topology.

The calculation engine 160 includes at least an analyte calculation module 162, a set calculation module 164, and a name resolver module 168. The collection of data caches 170 may include a calculated analytes cache 172, a calculated sets cache 174, a set-to-name mapping cache 176, a group-to-sample mapping cache 178, and an analyte-to-name mapping cache 180.

With respect to the calculation engine 160, the name resolver 168 utilizes at least data generated by the matcher module (see 126 in FIG. 2), and any data provided by the researcher via the marker loader module (see 135*d* in FIGS. 2-3). The matcher module 126 and marker loader module 135*d* may generate sets of links between identified analytes regardless of nameset data disparities, and may also generate data about analytes having no identified matches between the study data 123*a* and reference data stored in the data structure 106. The name resolver module 168 examines the entire nameset for each analyte in the study data 123 and may utilize the reference data stored in the data structure 106 specified by the selected library overlay(s) 128*x* to generate data regarding matches of analytes regardless of nameset disparities across the various data sources. The data generated by the name resolver 168 is configured to be loaded into an analyte-to-name mapping cache 180 and into a set-to-name mapping cache 176. The analyte-to-name mapping cache 180 may provide specific information to the render engine 190 to enable formatting of the analyte name data at the researcher computing system 20. The set-to-name mapping cache 176 may provide one source of input to the set calculation module 164 of the calculation engine 160.

Data sent to the analyte calculation module 162 includes two (2) or more sets of group-to-sample data from the group-to-sample mapping cache 178. The group-to-sample mapping cache 178 receives one or more groups 124*x* designated by the researcher. Each set of group-to-sample data may be based on the group(s) 124*x* designated by the researcher in study data 123*x*, including, without limitation, the group of all samples. The analyte calculation module 162 may perform a comparison of these sets of group-to-sample data (for example without limitation, t-test, Z-score, ANoVa testing, aROC, etc.) to generate statistical information about the differences between the individual analytes. The analytes may be keyed by the name identified in the study, even if analytes are identified within the reference data stored in the data structure 106 by some other nameset data. In other words, the analyte calculation module 172 derives difference data for individual analytes even when the analytes are known by different identifiers in the namesets of the various data sources. The analyte calculation module 162 populates a calculated analytes cache 172 in the collection of data caches 170 based on the derived difference.

The set calculation module 164 examines collections (sets) of analytes (as opposed to individual analytes) to identify statistically significant differences of each collection (set) of analytes, in the context of the current library overlay(s) 128*x*, between two groups within the study data 123. By way of example without limitation, this may involve signal-difference testing (such as chi-square) to determine if a set (collection) is of interest in the context of the current library overlay(s) 128*x*. This calculation may be performed repeatedly, or even recursively to score 166 each set. That is, based on the current library overlay(s) 128*x*, and input from the calculated analytes cache 172 (containing data generated by the analyte calculation module 162 of the calculation engine 160), and using the set-to-name mapping cache 176 (containing data generated by the name resolver module 168 of the calculation engine 160) to assign analytes to sets, the set calculation module 164 uses scoring 166 to generate statistical information about the characteristics of each set. Notably, the selected library overlay(s) 128*x* may use nameset information for an analyte in a set that is completely independent of the nameset information for the same analyte in the study data 123, but the analyte may still be appropriately accounted for in the set's statistical information.

Data from the collection of data caches 170 may be transmitted to the render engine 190. The render engine 190 may encapsulate the processed data for delivery to the researcher computing system 20 in a manner to facilitate presentation through the user interface 26 of the researcher computing system 20. For example without limitation, the render engine 190 may configure the data for presentation in a generic web browser or a proprietary presentation system. In another embodiment, the render engine 190 may package the data from the collection of data caches 170 for delivery to the researcher computing system 20 in a manner consistent with storage, handling, or further processing.

A researcher may generate and view reports, and otherwise interact with various aspects of the data analytics system, such as, e.g., marker matching, sets, etc. This may be done through a variety of user interfaces, a few of which are hereafter described for demonstrative purposes. The following user interfaces are illustrative of some of the capabilities of the data analytics system described above, and are not limiting of the disclosure.

Figure 5:
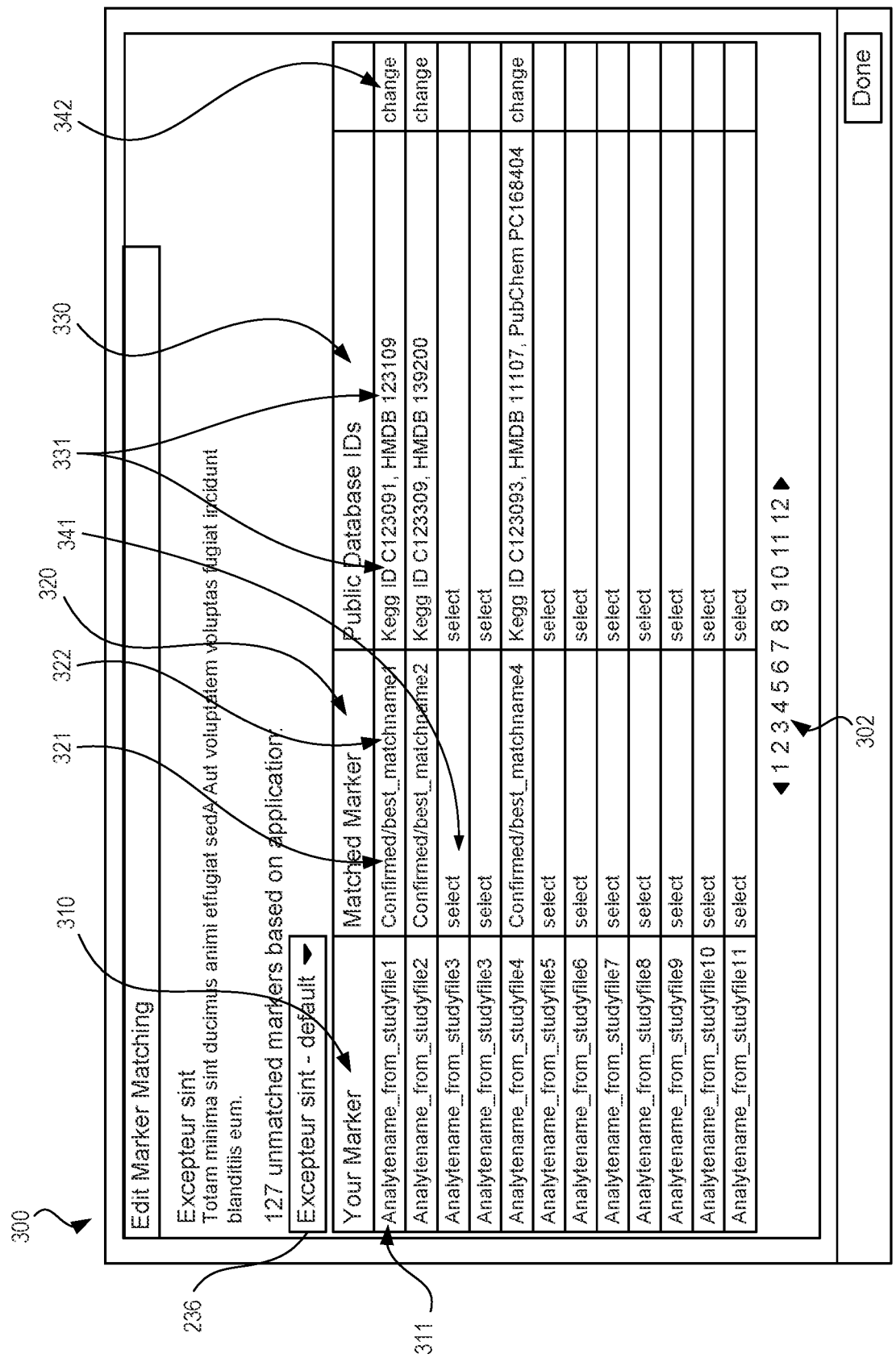
FIG. 5 Is an illustration of a marker matching interface according to an embodiment of a data analytics system.

FIG. 5 is an illustration of a marker matching interface 300 according to an embodiment of the data analytics system 100 of FIGS. 1-4. The marker matching interface 300 may allow a researcher to view a list 310 of analytes in the current study along with a list 320 of links to database references for matched markers from the reference data stored in the data structure 106 as selected by a library overlay selection pull-down menu 236 in the context of the current study. A list 330 of source databases may also be shown. The list 310 of study data analytes comprises one or more individual analytes each identified by a name 311. The list 320 may show a name 322 of an analyte from the reference data corresponding to the analyte name 311. A match confidence 321 may also be shown with the matched analyte name 322. An entry 331 may be shown in the list 330 of source databases for each matched analyte name 322 corresponding to the analyte name 311 in the study data analyte list 310. A researcher may select an input component to select 341 an analyte from the list 310. Each source database entry 331 may be a clickable link to allow the researcher to, for example, access information related to the matched analyte name 322 at the referenced database entry 331. For a study data analyte name 311 having a matched analyte name 322, a change button 342 may be presented in the interface 300 to allow the researcher to edit the analyte match in a matched marker editing interface. The researcher may navigate to another page of the analytes list 310 by clicking the appropriate number in a page navigation menu 302.

From the marker matching interface 300, a researcher may access an edit marker matching interface (not shown), which includes the study data analyte name 311, a list of potential analyte match candidates and/or analytes previously matched to the analyte name 311, and a list of source databases for the matched analytes. The list of potential matched analytes indicates each possible matching analyte, and the source databases list identifies the corresponding source database by entries which may be clicked to view information about the matched analyte at the source database. The matched marker editing interface may include a search interface to allow a researcher to search the reference data for analytes by any nameset data.

Figure 6:
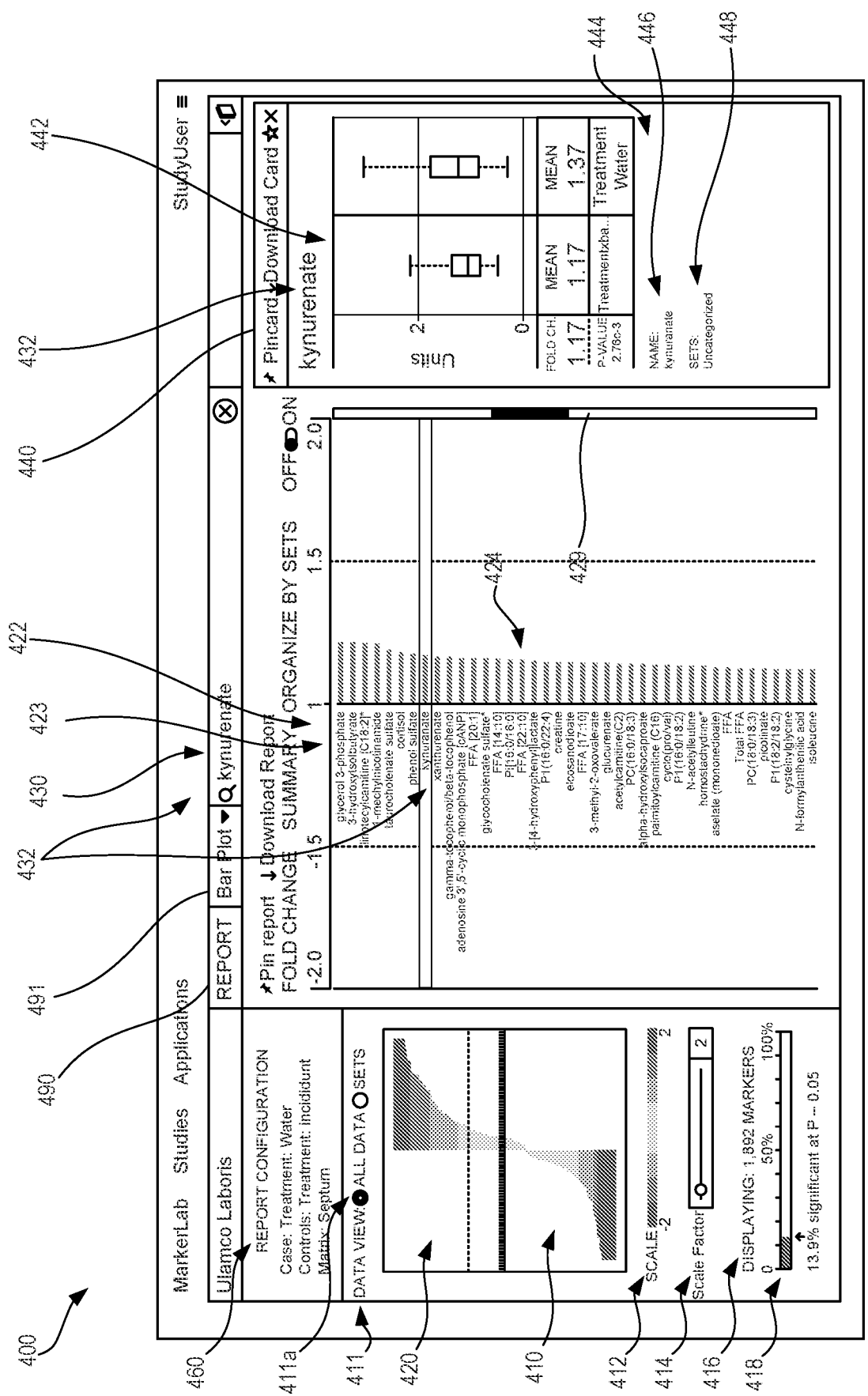
FIG. 6 is an illustration of a report interface according to an embodiment of a data analytics system.

FIG. 6 is an illustration of a report interface 400 according to an embodiment of the data analytics system 100 of FIGS. 1-4. The report interface 400 displays a global bar plot 410. A data view toggle 411 may be set to display all data 411a in the global bar plot 410. A scale 412 may be included. The scale 412 may be color coded, and the color coding of the scale 412 may be applied to the global bar plot 410. The scale 412 of the display may be tunable by means of a scale factor slider 414. A total number 416 of analytes reflected by the global bar plot 410 may be shown. A representation 418 of the number of analytes having significance at the selected metric may also be presented. The global bar plot 410 may include focus area 420. The analytes within the focus area 420 may be shown with more detailed information in the focus area bar plot 422. The focus area 420 may include a list of analytes 423 in the focus area bar plot 422. The focus area bar plot 422 may include an individual bar plot 424 corresponding to each analyte 423 in the list of analytes 423 within the focus area bar plot 422. A scroll bar 429 may be present adjacent the focus area bar plot 422 to permit the researcher a fine-grained means of navigating about the focus area 420 and focus area bar plot 422. A search function 430 may also be included on the report interface 400 to permit the researcher to enter a name of an analyte which may be in the bar plot 410. A list of candidates may be presented. A particular match candidate may be shown, either as a default, or by selection of the researcher. The report interface 400 may include a report configuration button 460 to allow the researcher to adjust parameters affecting the presentation of data in the report interface 400. The report interface 400 may also include a report selection menu 490. The report selection menu 490 may display the current report type, such as, for example, bar plot 491 as shown in FIG. 6.

The analyte name 432 from a search may be highlighted within the focus area bar plot 422. The focus area bar plot 422 may be configured to automatically scroll to that region of the global bar plot 410 in which the particular analyte 432 may be found. A summary card 440 corresponding to the analyte 432 may be shown. The summary card 440 may include the analyte name 432, relevant metrics 442 of the analyte 432, annotations 444 related to the analyte 432, a nameset data 446 for the analyte 432, the sets 448 of which the analyte 432 is a member in the context of the current study (or an indication that the analyte 432 is a member of no set) and links to reference database(s) 34x, the links allowing the researcher to access information related to the matched analyte name at the reference database(s) 34x.

The data view toggle 411 may be set to display data by sets. One or more sets may be identified in the context of the current study. For example a first set and a second set may be identified among the sets. For each set identified, a list of analytes 423 and a collection of corresponding individual bar plots 424 may be displayed. Each of the individual bar plots 424 is shown according to its relative value in the context of the current study. In other words, and in the context of the current study, some individual bar plots 424 each may have a value placing the bar plots to a right side, while other individual bar plots 424 may have a value placing the bar plots to a left side. The corresponding analyte names may be placed opposite each individual bar plot 424. Significant set metrics may be displayed in conjunction with each set.

A researcher may employ a report configuration interface to selectively configure various reports generated by the data analytics system. The report configuration interface may include a library overlays selection menu, which may indicate the currently selected library overlay(s) among the members of available library overlays. The report configuration interface may include report controls, which may contain any of a variety of controls, parameter inputs, etc., without limitation, relevant to the current library overlay. The report configuration interface may include one or more buttons such as a cancel button and an apply button, which may serve to, respectively, abandon or commit (apply) any changes made via the report configuration interface.

Figure 7:
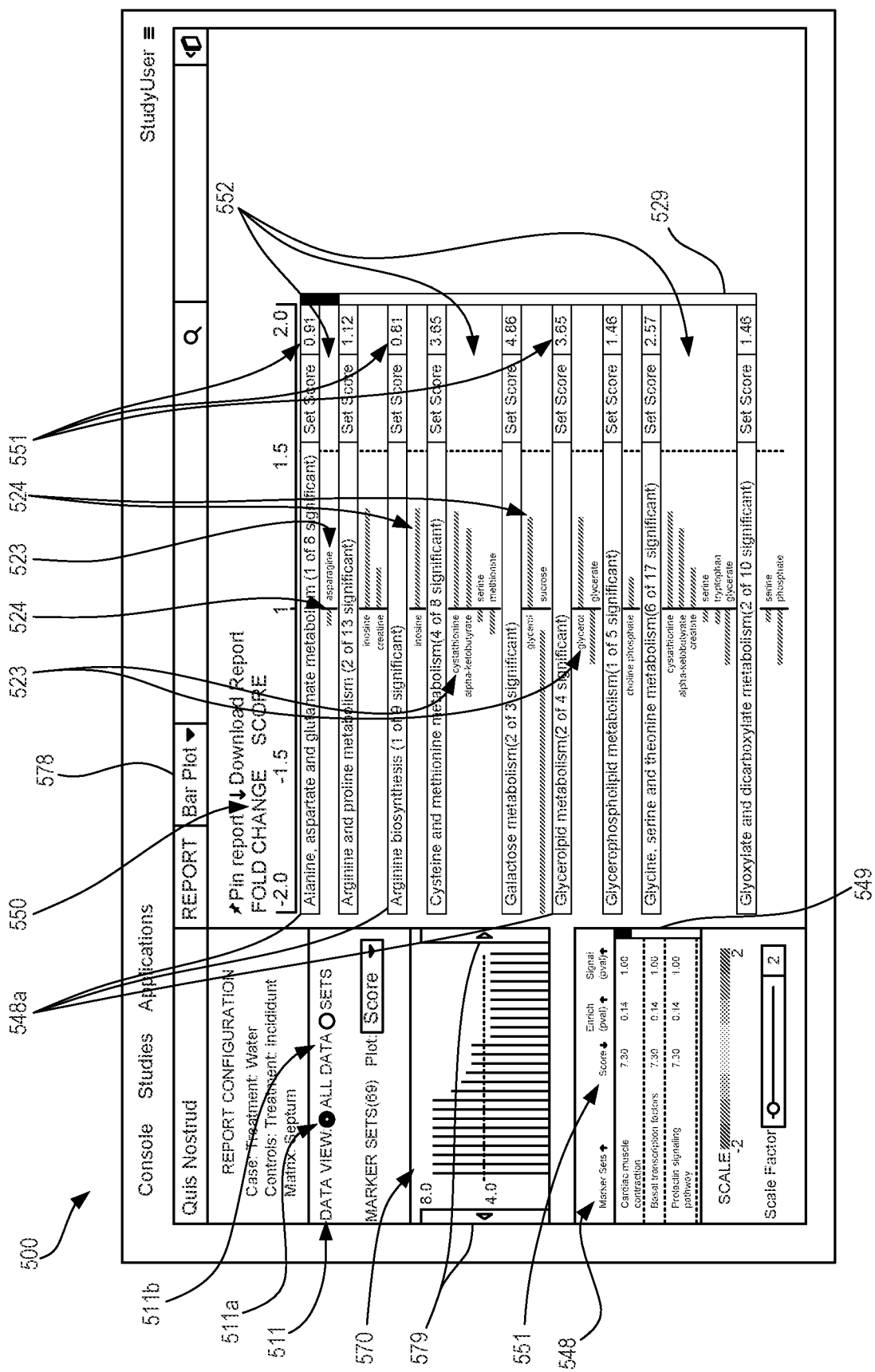
FIG. 7 is an illustration of a report interface according to an embodiment of the data analytics system showing a global histogram.

FIG. 7 is an illustration of a report interface 500 according to an embodiment of the data analytics system 100 of FIGS. 1-4, showing a global histogram 570. The report interface 500 may include a data view toggle 511 to both permit a researcher to toggle between displaying all data 511a and displaying set-wise data 511b, and indicate which data view mode is currently selected. A report metrics indicator 550 may be included to describe the metric upon which data of the report interface 500 is based, as defined in the report configuration interface 461. Sets 548 in the context of the current study and applied library overlay(s) may be shown, along with corresponding set metrics 551. A scroll bar 549 may be provided to allow the researcher to navigate among the sets 548. Individual sets 548a may be shown with a collection 552 of analytes 523 belonging to each set 548a. Each analyte 523 may be accompanied by an individual bar plot 524. Set metrics 551 may be displayed. A scroll bar 529 may be provided to permit navigating among the sets 548a. Horizontal scroll buttons 579 may be provided to permit navigating the global histogram 570.

From the report interface 500, a researcher may select a set from the global histogram 570. The histogram of the selected set may be shown in the context of the global histogram 570. The selected set may also be shown in the list of sets 548. A list of analytes 523 and corresponding histograms may be displayed within the set. A plot type selector may permit selection of a different plot method and may display the current plot method. The available plot methods 578 may be shown by a pull-down menu, for example, and the researcher may select from available plot methods. Available plot methods may include score, enrichment, signal, etc. Similarly, report types may be available by a pull-down menu, for example. Report types may include bar plot, volcano plot, pathway map, etc. With a report type selected, a report of the type selected is shown, and an indicator may be present to identify the report type by name.

Figure 8:
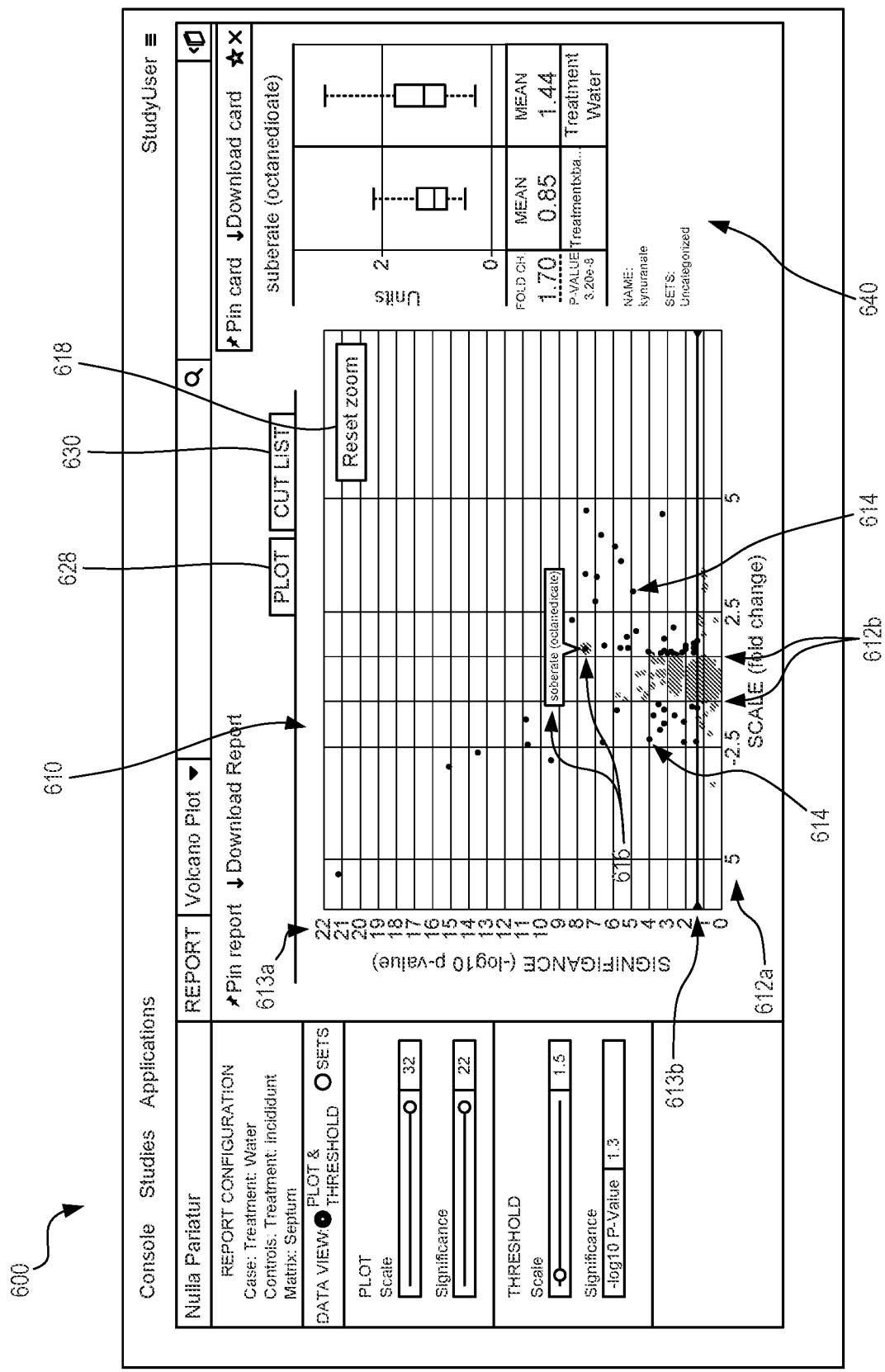
FIG. 8 is an illustration of a report interface displaying a summary card for a selected analyte.

FIG. 8 is an illustration of a report interface 600 displaying a summary card 640 for a selected analyte 616. The researcher may focus on a region of a volcano plot 610 by, for example without limitation, using a pointing device (not shown) to "click and drag" so that the region within the "click and drag" may be magnified. The researcher may also reset the report to display the full volcano plot 610 by clicking a reset zoom button 618. The volcano plot 610 may include scale discriminators 612a and significance discriminators 613a, and threshold scale and significance discriminators 612b, 613b, with analyte plot points 614 based on the relevant metric and, in particular, showing the analyte plot points 614 falling above/below the threshold scale and significance discriminators 612b, 613b. The threshold scale and significance discriminators 612b, 613b may be adjusted by the researcher using volcano plot configuration tools. Each analyte within the context of the current study may be displayed by a plot point 614 placed in the volcano plot 610 by a relevant value of the particular analyte. Each plot point 614 may be color coded to further indicate a value of the particular analyte. The researcher may click on a plot point 616, which may cause the particular plot point 616 to become highlighted, and/or display the name of the analyte associated with the selected plot point 616, or some other relevant datum. Selecting a plot point 616 may also cause the summary card 640 to be displayed. The summary card 640 may display data about the selected analyte as described elsewhere in the disclosure. The report interface 600 may include a selector tab 628 for the display of the volcano plot 610, and a selector tab 630 for the display of a cut list within the context of the current study and selected plot parameters.

With the cut list tab 630 selected, the researcher may set a threshold (or "cut") value using, for example, a threshold scale control and/or threshold significance control. The report interface 600 with the cut list tab 630 selected may display a list of analytes having values that exceed the cut value in the relevant metric(s). A list of corresponding metric values may also be shown. The researcher may select an analyte by clicking on the analyte to cause the corresponding summary card 640 to be displayed.

From the report interface (see 500 in FIG. 7), the researcher may select an input component to render a pathway maps report. A pathway maps report may allow a researcher to view and interact with a pathway or pathway map. A histogram of pathway maps relevant to the current study may be shown. A list of pathway maps relevant to the current study may also be shown. For each pathway map in the list of pathway maps, a corresponding set of metrics may be displayed. A pathway map of interest may be selected, for example, by clicking on a corresponding member of the pathway maps histogram, or by clicking a pathway map in the list of pathway maps. Clicking on the pathway maps histogram member, or a pathway map from the list of pathway maps may cause a pathway map corresponding to the selection to be displayed. The pathway map may include one or more primary node(s) and/or one or more secondary node(s). The various nodes may be connected by pathways to illustrate relationships within the pathway map. The primary nodes and/or secondary nodes may be clicked to call up additional information about the particular node.

Figure 9:
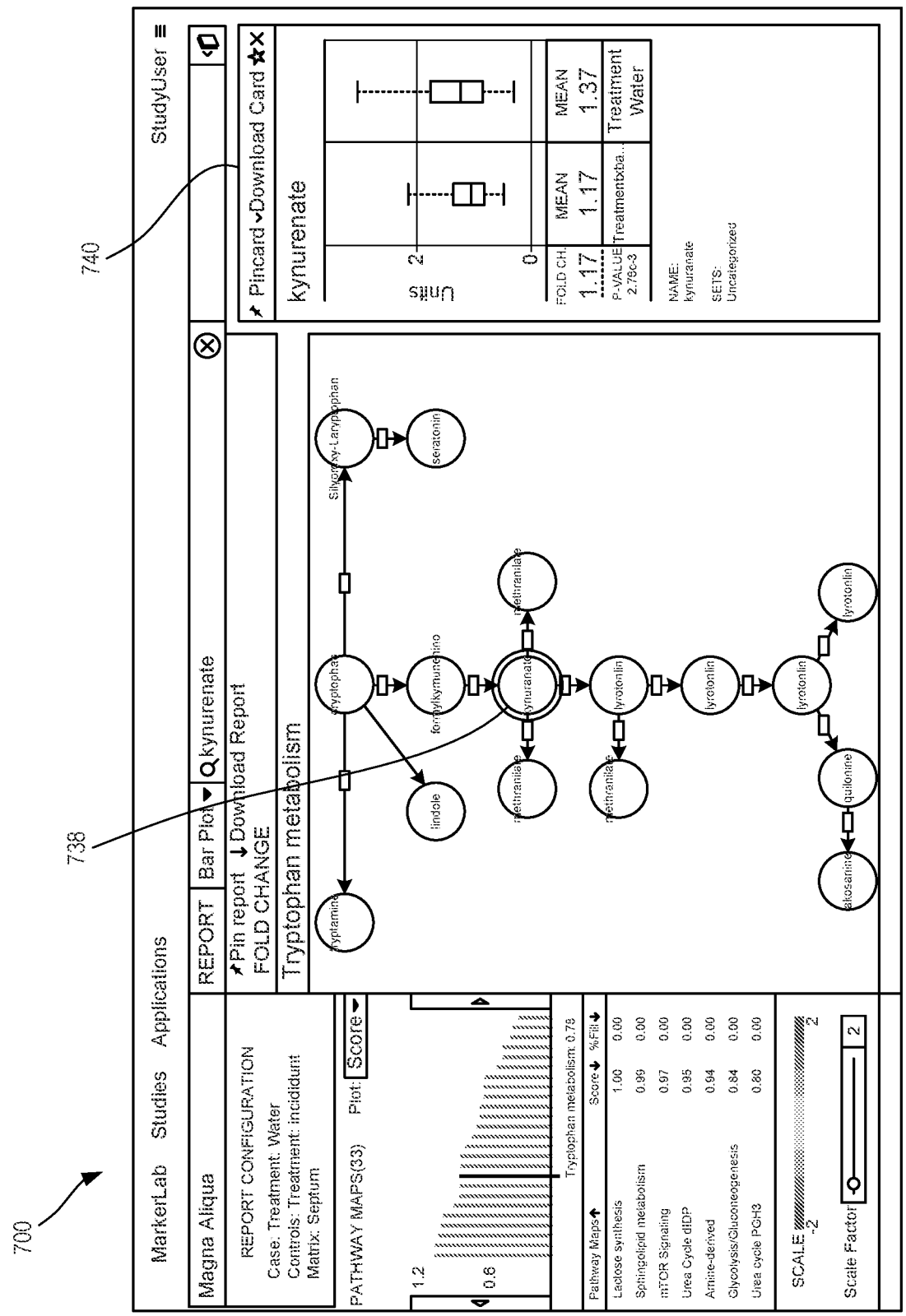
FIG. 9 is an illustration of a report interface displaying a pathway map and having a primary node selected.

FIG. 9 is an illustration of a report interface 700 having a primary node 738 selected. A summary card 740 may be displayed corresponding to the selected primary node 738. Similarly, a secondary node may be clicked, whereby the corresponding summary card for the secondary node may be displayed.

Figure 10:
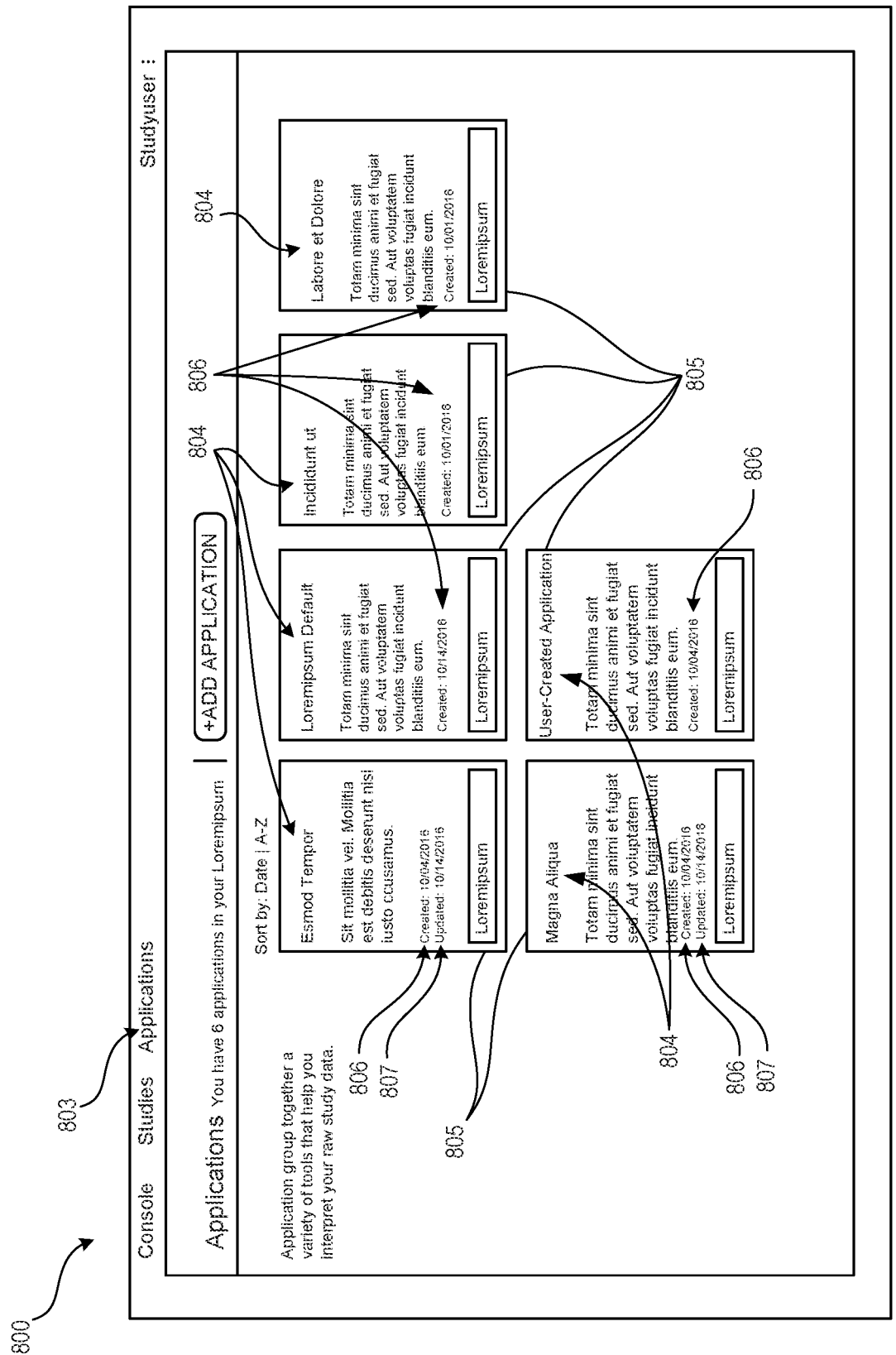
FIG. 10 is an illustration of an applications interface according to an embodiment of the data analytics system.

FIG. 10 is an illustration of an applications interface 800 according to an embodiment of the data analytics system 100 of FIGS. 1-4. The applications interface 800 may be accessed by clicking the applications button 803 on any interface where the applications button 803 may be displayed. The applications interface 800 may allow the researcher to, for example without limitation, edit or create a library overlay (see 128x in FIG. 3). Each application card 805 may correspond to, for example without limitation, a library overlay 128x, a study group 124x, or another researcher-editable library overlay component. Each application card 805 may include a library overlay name 804, a library overlay creation date 806 and/or an update date 807. The researcher may click on an application card 805 to view a list of items the researcher may edit (including creation and deletion).

Figure 11:
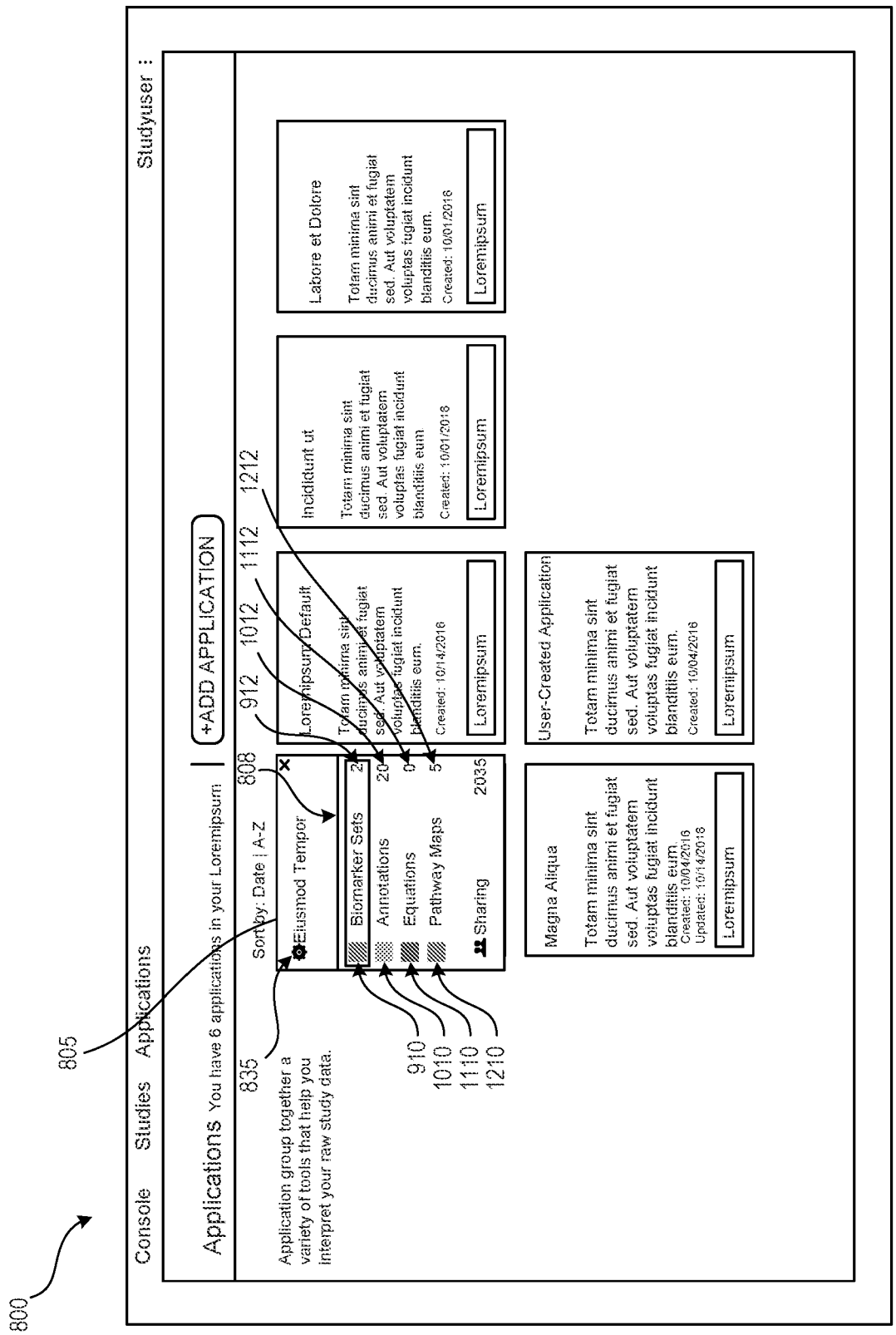
FIG. 11 is an illustration of the applications interface of FIG. 10 with a menu of editable items.

FIG. 11 is an illustration of the applications interface 800 of FIG. 10 with a menu 808 of editable items. In the example of FIG. 11, the application card 805 may represent a library overlay 128x. The menu 808 may include at least a sets editor link 910, an annotations editor link 1010, an equations editor link 1110, and a pathway maps editor link 1210. Each link 910, 1010, 1110, 1210 may be accompanied by a corresponding count 912, 1012, 1112, 1212 of items relevant to the particular link type. In other words, the sets editor link 910 may include a sets count 912 indicating how many sets are defined for the library overlay. Clicking an editor link 910, 1010, 1110, 1210 may cause the corresponding editor to be displayed. The researcher may click an edit tools button 835 to access additional edit tools, including copy tools (see 135 in FIG. 3).

Figure 12:
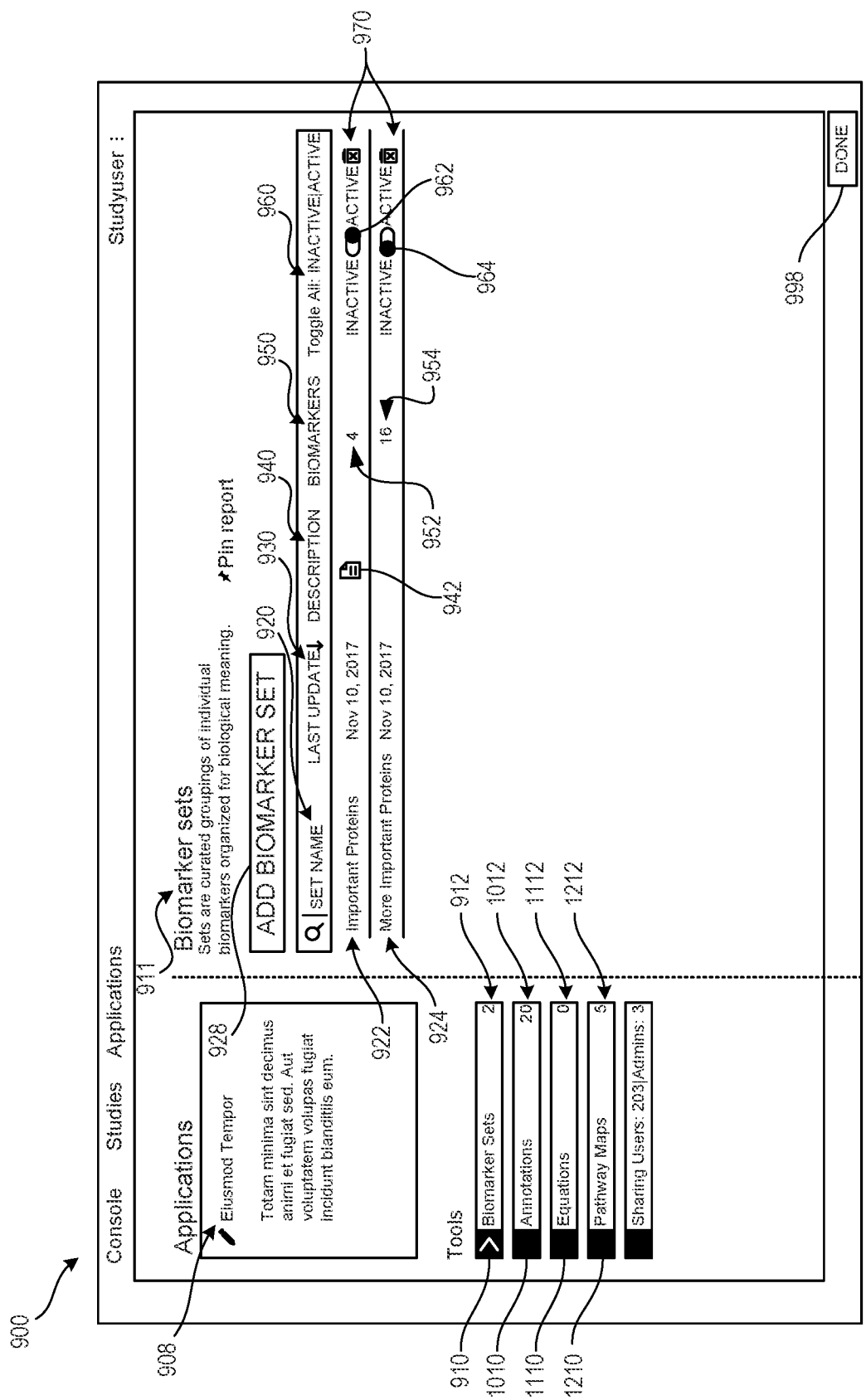
FIG. 12 illustrates a sets editor interface according to an embodiment of a data analytics system.

FIG. 12 is an illustration of the sets editor interface 900 according to an embodiment of the data analytics system 100 of FIGS. 1-4. The sets editor interface 900 may be accessed by clicking the sets editor link (see 910 in FIG. 11). The current library overlay 128x is identified at 908. The sets editor interface 900 may include links to each of the editors 910, 1010, 1110, 1210, and corresponding counts 912, 1012, 1112, 1212. The set editor 911 is identified as such on the sets editor interface 900. The sets editor interface 900 may include a list of sets 920, a list of corresponding set update dates 930, a list of corresponding description flags 940, a list of corresponding set member counts 950, a toggle list 960 indicating the active or inactive state of each set and permitting toggling all sets active or all sets inactive, and corresponding delete buttons 970. For the present example, the list of sets 920 includes two sets 922, 924. A last update date (at 930) is shown corresponding to each set 922, 924. The set 922 is shown having a collection of annotations 942. The sets editor interface 900 shows that set 922 has four (4) members 952, and the set 924 has sixteen (16) members 954. Set 922 is shown toggled active 962, and may be toggled inactive. Set 924 is shown toggled inactive 964, and may be toggled active. Either set 922 or 924, or both, may be deleted from the current study by selecting the corresponding delete button 970. Each set 922, 924 in the sets list 920 is a clickable link to permit the researcher to edit additional details regarding the corresponding set. The researcher may select an input component 928 to add a biomarker set to the report interface 900. The researcher may return to the applications interface (see 800 in FIG. 10) by clicking a done button 998.

Figure 13:
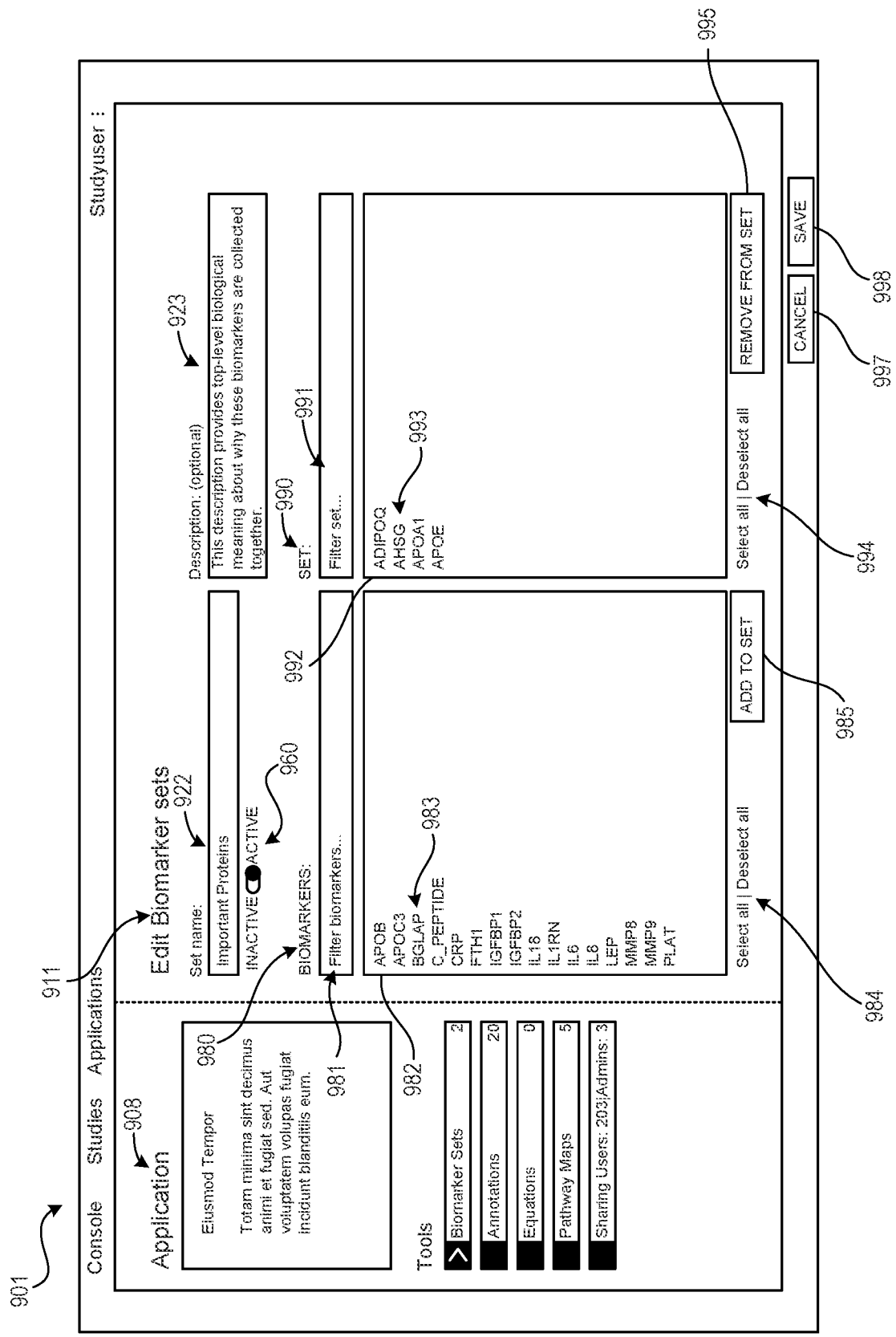
FIG. 13 is an illustration of a set editor interface according to an embodiment of a data analytics system.

FIG. 13 is an illustration of a set editor interface 901 according to an embodiment of the data analytics system 100 of FIGS. 1-4. The set editor interface 901 may be accessed by clicking on a set (see 922 in FIG. 12) in the sets list (920 in FIG. 12) of the sets editor interface (900 in FIG.

12). The set editor interface 901 may indicate the researcher is editing a set 911 within a library overlay (see 128$x$ in FIGS. 2-3) 908, and may indicate the particular set 922 being edited. A description 923 of the current set 922 may be displayed (and may be edited). The researcher may select and apply one or more biomarker filters 981 to include or exclude biomarkers according to a selected filter. Similarly, the researcher may select and apply one or more set filters 991 to include or exclude sets according to a selected filter. The set editor interface 901 may include the active/inactive toggle 960 by which the current active/inactive state of the current set 922 may be shown, and may be toggled. The set editor interface 901 may include an excluded analytes region 980 (analytes not included in the current set 922), and an included analytes region 990 (analytes that are included in the current set 922). The excluded analytes region 980 may include a list 982 of analytes available but not presently included in the current set 922. Similarly, the included analytes region 990 may include a list 992 of analytes included in the current set 922. The researcher may select (by clicking with a pointing device, for example) an analyte 983 from the list 982 of the excluded analytes region 980, then click an add button 985 to include the selected analyte 983 in the current set 922. The selected analyte 983 may then be removed from the excluded analytes region 980 and displayed in the included analytes region 990. An analyte 983 selected for inclusion may be highlighted or otherwise visually designated when displayed in the included analytes region 990 so the researcher may be aware of each previously excluded analyte 983 that is being added to the current set 922. The researcher may also select multiple analytes 983 in the excluded analytes list 982 (by, for example, shift-clicking with a pointing device) and add the plurality of analytes 983 to the included analytes list 992. The researcher may select (or deselect) all members of the excluded analytes list 982 by clicking a select-all/deselect-all button 984. If the researcher has selected all members of the excluded analytes list 982, all members of the excluded analytes list 982 may be added to the included analytes list 992 by clicking the add button 985. Similarly, one or more of the analytes included in analytes list 992 may be selected for removal from the included analytes list 992 (employing click, shift-click, or the select-all button 994) and clicking a remove button 995. Changes made on the set editor interface 901 may be confirmed and committed by clicking a save button 998, or may be abandoned by clicking a cancel button 997.

Figure 14:
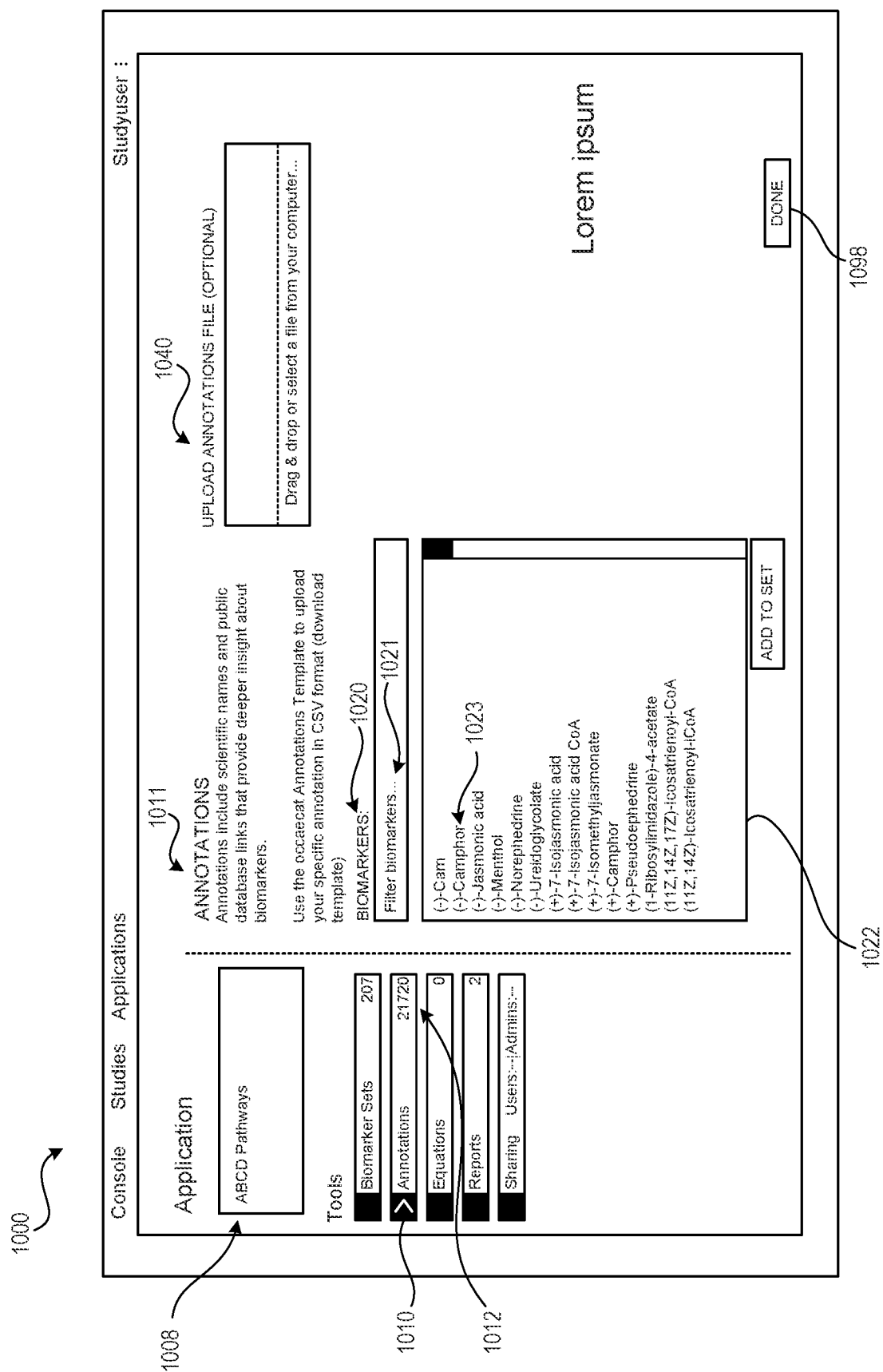
FIG. 14 is an illustration of an annotations editor interface according to an embodiment of a data analytics system.

FIG. 14 is an illustration of an annotations editor interface 1000 according to an embodiment of the data analytics system 100 of FIGS. 1-4. The annotations editor interface 1000 may be accessed by clicking the annotations editor link 1010. The annotations editor link 1010 may be displayed on each editor interface (as shown in FIG. 12, et seq.) or with an application card (see 805, 808, 1010 in FIG. 11). The annotations editor interface 1000 may include an identifier 1008 for the current library overlay 128$x$, an identifier 1011 of the annotations editor interface 1000, an analyte selection interface 1020, and an annotations file upload interface 1040. A count 1012 of annotations for the current study may be shown. The analyte selection interface 1020 may include a list 1022 of analytes in the current library overlay. The list 1022 comprises individual analytes 1023 identified by name in the current library overlay (see 128$x$ in FIG. 2). The analyte selection interface 1020 may include a search field 1021 to permit the researcher to search for a particular analyte. The annotations file upload interface 1040 may permit the researcher to upload an annotations data file from or through the researcher computing system (see 20 in FIG. 1). A researcher may commit (save) any changes to annotations by clicking a done button 1098.

Figure 15:
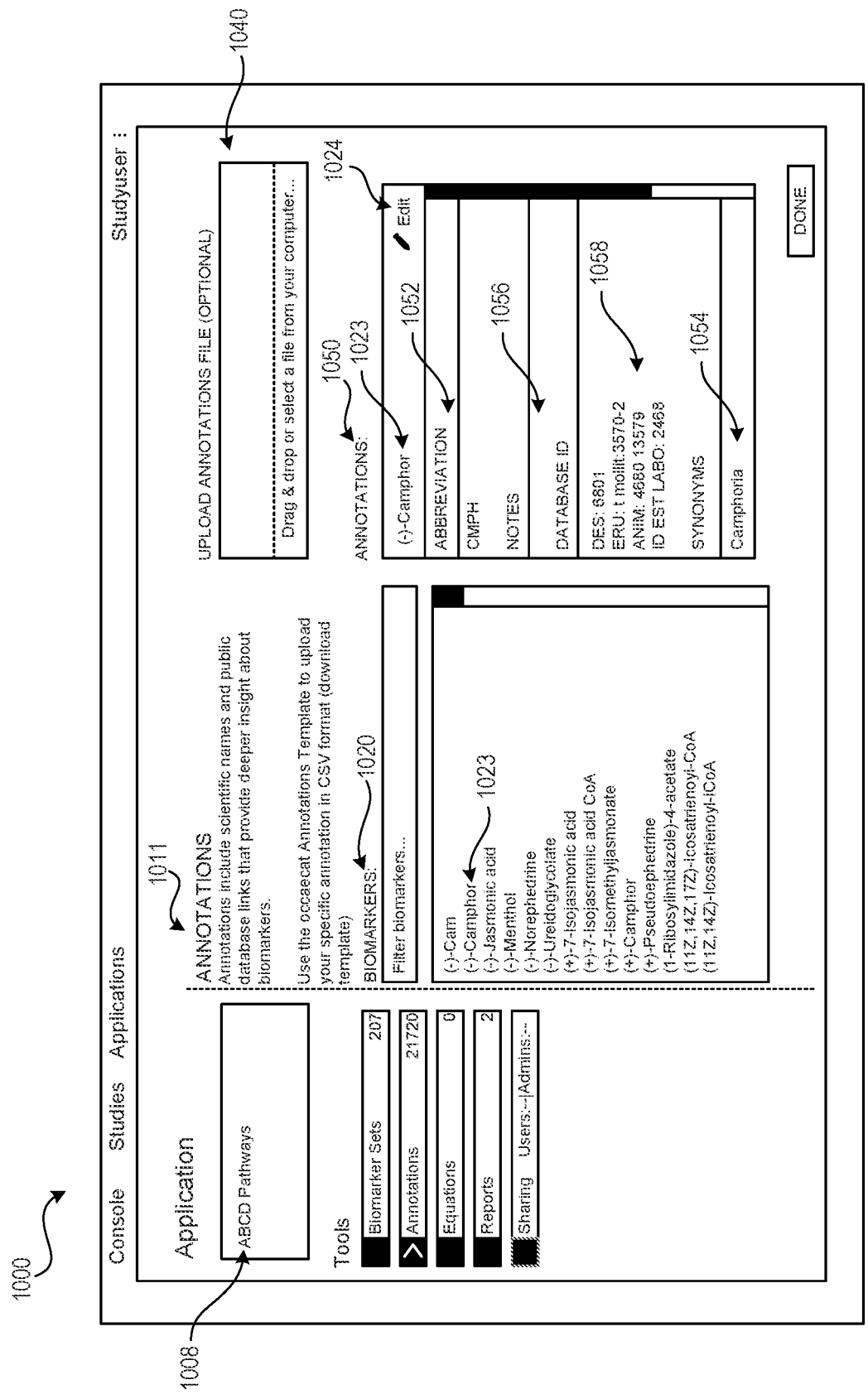
FIG. 15 is an illustration of the annotations editing interface of FIG. 14 having an analyte selected.

FIG. 15 is an illustration of the annotations editor interface 1000 of FIG. 14 having an analyte 1023 selected. The researcher may select an analyte 1023 by clicking on the analyte 1023 in the analyte selection interface 1020. A summary card 1050 for the selected analyte 1023 may then be displayed. The summary card 1050 may include the analyte name 1023, an edit button 1024, abbreviations 1052 for the selected analyte 1023, nameset data 1054, notes 1056, and reference database information 1058. Clicking the edit button 1024 may permit the researcher to edit data populating the summary card 1050. The reference database information 1058 may include clickable link(s) to permit the researcher to retrieve data for the selected analyte 1023 from the corresponding reference database 34$x$.

With the annotations editor interface 1000 in the edit mode, the appearance and functionality of a summary card 1050 may change. The summary card 1050 may display the name of the selected analyte 1023, and may include a names tab, e.g., a notes tab, a reference tab, and a database ID tab. With the names tab selected, the summary card 1050 may include a list of names contained within nameset data for the selected analyte 1023 found in the reference data for the current library overlay 128$x$. A preferred name for the selected analyte 1023 in the currently library overlay 128$x$ may be shown. Additional names associated by nameset data to the selected analyte 1023 may also be shown. The researcher may select a name to edit. The researcher may also designate (or remove the designation of) a preferred name for the selected analyte 1023. Any change(s) made in the edit annotations mode may be abandoned or committed (saved).

With the annotations editor interface 1000 in the edit annotations mode and having the notes tab selected, the summary card 1050 may display the analyte name 1023, and may have a text entry field for adding/editing notes associated to the selected analyte 1023. With the annotations editor interface 1000 in the edit annotations mode and having the reference tab selected, the summary card 1050 may display the selected analyte name 1023, a field for entry of a uniform resource locator (URL), a field for entry of text to display for the URL, and an add button to add the URL and text to the current annotation for the selected analyte 1023. The reference tab may also display any reference link previously associated to the current analyte 1023, and may permit the researcher to edit or delete a previously associated reference link.

With the annotations editor interface 1000 in the edit annotations mode and having the database ID tab selected, the summary card 1050 may display the selected analyte name 1023, a list of databases IDs associated to the selected analyte 1023, a database selection pull-down menu button, a search field, and an add button. The researcher may filter (limit to database IDs associated with a particular database) the database IDs shown in the list, for example by clicking the database selection pull-down menu button and selecting a particular database from the menu items. The researcher may also enter a database in the search field to filter the display of database IDs in the list. The researcher may add a database ID by clicking the add button. Clicking the add button may call out an interface to permit the researcher to enter relevant information for a new database ID entry. The researcher may remove a database ID from the list by clicking a corresponding delete button. From the applications interface (see 800 in FIG. 11), the equations editor button (see 1110 in FIG. 11) may call out an interface having contextually similar relevant functionality as described for the set editor interface (see FIGS. 12, 13) and/or the annotations editor interface (see FIGS. 14, 15).

The pathway maps editor button (see 1210 in FIG. 11) may call out an interface having contextually similar relevant functionality as described for the set editor interface (see FIGS. 12, 13) and/or the annotations editor interface (see FIGS. 14, 15).

EXAMPLES

The following are some examples of data processing after the method disclosed. In order to avoid complexity in providing the disclosure, not all of the examples listed below are separately and explicitly disclosed as having been contemplated herein as combinable with all of the other examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A data analytics system, comprising: a parser to generate a library overlay comprising reference data received from a reference database and one or more organizing components derived from the reference data, the parser to store the library overlay in a data structure of the system; an uploader to receive, and/or upload to the data structure, study data, wherein an organization of the study data is different than an organization of the reference data; and a calculation engine to: compare the study data with the reference data to identify one or more correlations between an instance of an analyte in the study data with data about that analyte in the reference data; and manipulate the study data and/or the reference data according to the one or more organizing components of the library overlay to generate a composite set of data from the reference data and the study data, the composite set of data defining relationships between the reference data and the study data according to the correlations.

Example 2. The system of Example 1, wherein the parser is further to organize the reference data of the library overlay according to the one or more organizing components of the library overlay.

Example 3. The system of Example 1, wherein the calculation engine compares the study data with the reference data by comparing analyte nameset data in the study data with analyte nameset data of the reference data and each of the one or more correlations is based on a name of the analyte.

Example 4. The system of Example 1, wherein the one or more organizing components of the library overlay comprises a pathways module comprising one or more of data (um), parameter(s), formula(ae), and instruction(s) that organizes one or more analytes according to a pathway comprising a progression related to the analyte.

Example 5. The system of Example 1, wherein the one or more organizing components of the library overlay includes an equations module including an equation (e.g., mathematical, chemical, logical, etc.) related to an analyte and/or to the data about analytes provided by the reference data.

Example 6. The system of Example 1, wherein the one or more organizing components of the library overlay includes a sets module to group analytes based on a scientifically meaningful relationship.

Example 7. The system of Example 1, wherein the one or more organizing components of the library overlay includes a matched markers module to apply identifiers of the analyte in the study data.

Example 8. The system of Example 1, further comprising edit tools to receive user input to modify at least one of the one or more organizing components of the library overlay.

Example 9. The system of Example 8, wherein the edit tools comprise one or more of a copy tool, a set editor, a pathway editor, a marker loader, an annotation editor, and an equation editor.

Example 10. The system of Example 1, wherein the study data comprises data for an instance of each of a plurality of analytes including the analyte, and wherein the reference data comprises data about the plurality of analytes.

Example 11. A method of data analytics (e.g., of a data analytics system) to create a composite set of data that provides a *nexus* between different data sets of analyte information, comprising: receiving reference data from one or more reference databases; parsing, by one or more processors, the reference data for storage in a data structure of a data analytics system and organized according to one or more organizing components of a library overlay, the one or more organizing components derived from the reference data; and receiving study data over a communication network from a researcher client computing device for storage in the data structure, wherein an organization of the study data is different than an organization of the reference data (e.g., different than while stored at the one or more reference databases; and also potentially different than stored in the data structure); comparing the study data (e.g., analyte nameset data within the study data) with the reference data (e.g., analyte nameset data within the reference data) to identify one or more correlations between an instance of an analyte in the study data and data about that analyte in the reference data; and manipulating the study data and/or the reference data according to the one or more organizing components of the library overlay to generate a composite set of data that provides a *nexus* between the reference data and the study data, according to the one or more correlations identified.

Example 12. The method of Example 11, wherein the study data comprises data for an instance of a plurality of analytes including the analyte, and wherein the reference data comprises data about the plurality of analytes.

Example 13. The method of Example 11, wherein comparing the study data with the reference data comprises comparing analyte nameset data in the study data with analyte nameset data of the reference data and each of the one or more correlations is based on a name of the analyte.

Example 14. The method of Example 13, wherein the one or more correlations is further based on a measurement of the analyte.

Example 15. The method of Example 11, wherein the one or more organizing components includes a pathway module comprising one or more of parameters, formulae, and instructions that organize one or more analytes according to a pathway comprising a progression related to the analyte.

Example 16. The method of Example 11, wherein the one or more organizing components includes an equations module including an equation related to an analyte and/or to the data about analytes provided by the reference data.

Example 17. The method of Example 11, wherein the one or more organizing components includes a sets module to group analytes based on one or more scientifically meaningful relationships.

Example 18. The method of Example 11, wherein the one or more organizing components includes a matched markers module to apply identifiers of the analyte in the study data.

Example 19. The method of Example 11, further comprising storing the composite set of data in a collection of data caches.

Example 20. The method of Example 11, further comprising rendering the composite set of data on a computer system of the user.

Example 21. A method of data analytics to create a representation of an analyte pathway, comprising: receiving reference data from one or more reference databases, the reference data including information about one or more analytes, the reference data further comprising pathway data providing information to organize the one or more analytes according to an analyte pathway; parsing, by one or more processors, the reference data for storage in a data structure of the data analytics system and organized according to a pathway module of a library overlay, the pathway module derived from the pathway data of the reference data; and receiving study data over a communication network from a researcher client computing device for storage in the data structure, wherein an organization of the study data is different than an organization of the reference data; comparing the study data (e.g., analyte nameset data within the study data) with the reference data (e.g., analyte nameset data within the reference data) to identify one or more correlations between an instance of an analyte in the study data and data about that analyte in the reference data; and manipulating the study data and/or the reference data according to the pathway module of the library overlay to generate a composite set of data that includes a representation of the analyte pathway and provides a *nexus* between the reference data and the study data, according to the one or more correlations identified.

Example 22. The method of Example 21, where in the representation of the analyte pathway in the composite set of data defines one or more relationships between the reference data and the study data according to the one or more correlations.

Example 23. The method of Example 21, further comprising: storing the composite set of data in a collection of data caches; and rendering a pathway map on a computer system of the user, the pathway map showing the analyte pathway, based on the representation of the pathway map included in the composite set of data.

Example 24. A method of data analytics to create a representation of an analyte set, comprising: receiving reference data from one or more reference databases, the reference data including information about one or more analytes, the reference data further comprising set data providing information to organize the one or more analytes according to an analyte set; parsing, by one or more processors, the reference data for storage in a data structure of the data analytics system and organized according to a set module of a library overlay, the set module derived from the set data of the reference data; and receiving study data over a communication network from a researcher client computing device for storage in the data structure, wherein an organization of the study data is different than an organization of the reference data; comparing the study data (e.g., analyte nameset data within the study data) with the reference data (e.g., analyte nameset data within the reference data) to identify one or more correlations between an instance of an analyte in the study data and data about that analyte in the reference data; and manipulating the study data and/or the reference data according to the set module of the library overlay to generate a composite set of data that includes a representation of the analyte set and provides a *nexus* between the reference data and the study data, according to the one or more correlations identified.

Example 25. The method of Example 24, wherein the representation of the analyte set in the composite set of data defines one or more relationships between the reference data and the study data according to the one or more correlations.

Example 26. A data analytics system, comprising: one or more data storage devices to store parsed reference data, study data, library overlays, and/or one or more collections of data caches; one or more processors in electrical communication with the data storage device; a parser to, by the one or more processors, receive and parse reference data to parsed reference data and to store the parsed reference data in a data structure, the reference data received from one or more reference databases; an uploader to receive study data designated by a researcher and to store the study data in the data structure; a matcher to, by the one or more processors, compare analyte nameset data in the study data with analyte nameset data from the reference data to generate one or more links each correlating an instance of an analyte in the study data with an instance of that analyte in the reference data; one or more library overlays, each library overlay including one or more modules to access reference data to generate organized associations of reference data; a calculation engine to receive a selection of at least one library overlay (of the one or more library overlays) and to, by the one or more processors, manipulate the reference data and study data according to the organized associations of the selected library overlay(s) to generate configured data stored in a collection of data caches for presentation to a researcher via a user interface.

Example 27. The data analytics system of Example 26, wherein the modules of a library overlay include one or more of a sets module, an annotations module, a pathways module, and an equations module.

Example 28. The data analytics system of Example 26, wherein: the modules of a library overlay include a matched markers module.

Example 29. The data analytics system of Example 26, further comprising: edit tools to manipulate a configuration of a library overlay, the edit tools including one or more of a copy tool, a set editor, a pathway editor, a marker loader, an annotations editor, and an equations editor.

Example 30. The data analytics system of Example 26, further comprising: a renderer to provide the collection of data caches to a researcher computer to present in a user interface on a display of the researcher computer for viewing by a user.

Example 31. A computer-implemented method of data analytics, comprising: receiving reference data from one or more remote reference databases over a communication network; parsing, by one or more processors, the reference data to parsed reference data for storage in a data structure; receiving study data over the communication network from a computing device as designated by input from a user for storage in the data structure; comparing analyte nameset data in the study data with analyte nameset data from the parsed reference data to generate one or more links each correlating an instance of an analyte in the study data with an instance of that analyte in the parsed reference data; generating organized associations of parsed reference data according to a selected library overlay, the library overlay including one or more modules to direct the manipulating of a collection of data to organized associations (or groupings); manipulating the parsed reference data and study data according to the organized associations of the selected library overlay to generate configured data; storing the configured data in a collection of data caches for presentation to a researcher via a user interface.

Example 32. A method of data analytic (e.g., of a data analytics system) to create a composite set of data that provides a *nexus* between different data sets of analyte information, comprising: receiving reference data from one or more reference databases; parsing, by one or more processors of the data analytics system, the reference data for storage in a data structure of the data analytics system; receiving study data over the communication network from a researcher client computing device for storage in the data structure, wherein an organization of the study data is different than an organization of the reference data (e.g., different than the organization of the reference data as stored at the one or more reference databases; and/or different than the organization of the reference data as stored in the data structure); comparing the study data (e.g., analyte nameset data in the study data) with the reference data (e.g., analyte nameset data from the reference data) to identify one or more correlations between an instance of an analyte in the study data and data about that analyte in the reference data; organizing the reference data according to one or more organizing components of a library overlay, the one or more organizing components derived from the reference data; and manipulating the study data and/or the reference data according to the one or more organizing components of the selected library overlay to generate a composite set of data that provides a *nexus* between the reference data and the study data, according to the one or more correlations identified.

Example 33. A researcher produces a study having interest in the citrate cycle, and, more particularly, analytes named citrate, cis-Aconitate, and isocitric acid. In the biological domain, these three analytes can be meaningfully grouped together as "citric acid metabolism." Two of the analytes, citrate and isocitric acid, can be meaningfully grouped together as "citrate and related compounds." The researcher selects two reference databases. One reference database has knowledge of all three of these analytes, that each of these three analytes is known by three names (or synonyms, pseudonyms, or abbreviations), and of the meaningful biological grouping of the three analytes as "citric acid metabolism." That is, this first reference database records the knowledge that citrate can be known by the names "citrate," "citric acid," and "anhydrous citric acid." Similarly, cis-Aconitate can be known by "cis-Aconitate," "cis-Aconitic acid," and "Achilleic acid," and D-isocitrate can be known by "D-isocitrate," "isocitric acid" and "isocitrate." This first database, however, does not record the fact that citrate and D-isocitrate can be meaningfully grouped together as "citrate and related compounds." The second database has knowledge of only the first name of each analyte (citrate, cis-Aconitate, D-isocitrate), but has knowledge of the meaningful biological grouping "citrate and related compounds" that includes the names "citrate" and "D-isocitrate." Once the new data structure is instantiated, including populating the appropriate tables with this information, the name resolver is able to iteratively traverse the data structure to determine the meaningful biological groupings from both reference databases based on all name possibilities from both reference databases. In this example, the method yields isocitric acid, the name in the researcher's study, in the "citrate and related compounds" grouping even though the curator of the second database, the reference data that identified the "citrate and related compounds" grouping, was unaware of the name "isocitric acid" at the time of authoring. This enables the researcher to incorporate more data from more data sources in the researcher's study, and to derive greater data and meaning from such inclusion.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module, module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communication network. In a distributed computing environment, software modules may be located in local and/or remote memory storage devices. In addition, data being tied or rendered together in a database record may be resident in the same memory device, or across several memory devices, and may be linked together in fields of a record in a database across a network.

A control component can refer to a set of instructions in a machine readable format and corresponding display artifact(s), the combination of which provides a user with an ability to interact with a page displayed on a computing device display to trigger a pre-defined behavior. By way of example without limitation, a control component may include text, a hypertext link, one or more variables, regular expressions, input style instructions (such as, among others, radio-button, check box, numeric field, text field, etc.), graphical components such as buttons or icons, behavior controls (such as on load, on hover, on click, etc., or the equivalents in any relevant platform), etc. Examples of user interactions with a control component include hover (or hover on, mouse enter, etc.) (wherein the user places a cursor, such as a mouse cursor) within a defined region for the control component, click (wherein the user places the cursor within a defined region for the control component and presses a physical button, such as a mouse button or a key on a keyboard), hover off or mouse leave (wherein the user causes the cursor to leave a defined region of the control component). Examples of behavior include without limitation load another page; reload the current page (refresh); send data to a defined recipient, such as another user, or a fully qualified network address (iPV4, iPV6 or other computing device identifier, port identifier, etc.); menu display; submenu display; etc.

It will be obvious to those having skill in the art that many changes may be made to the details of the above-described embodiments without departing from the underlying principles of the invention. The scope of the present invention should, therefore, be determined only by the following claims.

The invention claimed is:

1. A data analytics system, comprising:
a library overlay comprising reference data received from multiple reference databases and organized according to one or more organizing components derived from the multiple reference databases, wherein each of the multiple reference databases provides reference data different from other of the multiple reference databases; and
a calculation engine to, by one or more processors:
compare study data with the reference data to identify one or more correlations between an instance of an analyte in the study data with data about that analyte in the reference data, wherein an organization of the study data is different than an organization of the reference data; and
manipulate the study data according to at least one of the one or more organizing components of the library overlay to generate a composite set of data from the reference data and the study data, the composite set of data defining relationships between the reference data and the study data according to the one or more correlations.

2. The system of claim 1, wherein the calculation engine compares the study data with the reference data by comparing analyte nameset data in the study data with analyte nameset data of the reference data, and wherein each of the one or more correlations is based on a name of the analyte.

3. The system of claim 1, wherein the one or more organizing components of the library overlay comprises a pathways module that organizes one or more analytes according to a pathway comprising a progression related to the analyte.

4. The system of claim 1, wherein the one or more organizing components of the library overlay comprises an equations module including an equation related to an analyte.

5. The system of claim 1, wherein the one or more organizing components of the library overlay comprises a sets module to group analytes based on a scientifically meaningful relationship.

6. The system of claim 1, wherein the one or more organizing components of the library overlay includes a matched markers module to apply identifiers of the analyte in the study data.

7. The system of claim 1, further comprising edit tools to receive user input to modify at least one of the one or more organizing components of the library overlay.

8. The system of claim 1, wherein the study data comprises data for an instance of each of a plurality of analytes including the analyte, and wherein the reference data comprises data about the plurality of analytes.

9. The system of claim 1, further comprising a parser to generate the library overlay and to organize the reference data of library overlay according to the one or more organizing components of the library overlay.

10. The system of claim 9, wherein the parser is further to generate a plurality of library overlays each comprising reference data from a reference database and one or more organizing components derived from the reference data.

* * * * *